United States Patent
Park et al.

(10) Patent No.: US 10,468,686 B2
(45) Date of Patent: Nov. 5, 2019

(54) COMPOSITE CATHODE ACTIVE MATERIAL FOR LITHIUM BATTERY, CATHODE FOR LITHIUM BATTERY INCLUDING THE SAME, AND LITHIUM BATTERY INCLUDING THE CATHODE

(71) Applicants: SAMSUNG ELECTRONICS CO., LTD., Suwon-si, Gyeonggi-do (KR); Samsung SDI Co., Ltd., Yongin-si, Gyeonggi-do (KR)

(72) Inventors: Kwangjin Park, Seongnam-si (KR); Junho Park, Seoul (KR); Sukgi Hong, Seongnam-si (KR); Byungjin Choi, Seoul (KR)

(73) Assignees: SAMSUNG ELECTRONICS CO., LTD., Gyeonggi-Do (KR); SAMSUNG SDI CO., LTD., Gyeonggi-Do (KR)

( * ) Notice: Subject to any disclaimer, the term of this patent is extended or adjusted under 35 U.S.C. 154(b) by 306 days.

(21) Appl. No.: 15/403,583

(22) Filed: Jan. 11, 2017

(65) Prior Publication Data

US 2017/0365859 A1 Dec. 21, 2017

(30) Foreign Application Priority Data

Jun. 17, 2016 (KR) .................. 10-2016-0075839

(51) Int. Cl.
*H01M 4/505* (2010.01)
*H01M 4/62* (2006.01)
*H01M 4/36* (2006.01)
*H01M 4/525* (2010.01)
*H01M 10/0525* (2010.01)
(Continued)

(52) U.S. Cl.
CPC ............ *H01M 4/628* (2013.01); *C01B 25/45* (2013.01); *C01G 25/00* (2013.01); *C01G 25/006* (2013.01);
(Continued)

(58) Field of Classification Search
None
See application file for complete search history.

(56) References Cited

U.S. PATENT DOCUMENTS

2014/0106223 A1 4/2014 Xu et al.
2015/0295239 A1* 10/2015 Harata .................. H01M 4/366
429/223
(Continued)

FOREIGN PATENT DOCUMENTS

CA 2813663 A1 5/2012
CN 103094552 A 5/2013
(Continued)

OTHER PUBLICATIONS

Wu et al., Surface modification of LiNi0.5Mn1.5O4 by ZrP2O7 and ZrO2 for lithium-ion batteries, Jounral of Power Sources 195 (2010) 2909-2913.*

(Continued)

*Primary Examiner* — Tracy M Dove
(74) *Attorney, Agent, or Firm* — Cantor Colburn LLP

(57) ABSTRACT

A composite cathode active material for a lithium battery, the composite cathode active material including: a lithium composite oxide; and a coating layer disposed on at least a portion of the lithium composite oxide and including a composite including $ZrP_2O_7$ and $LiZr_2(PO_4)_3$, wherein the composite including $ZrP_2O_7$ and $LiZr_2(PO_4)_3$ is a reaction product of an acid treated a zirconium precursor, a phosphorus precursor, and the lithium composite oxide.

29 Claims, 30 Drawing Sheets

(51) Int. Cl.
*C01B 25/45* (2006.01)
*C01G 25/00* (2006.01)
*C01G 53/00* (2006.01)
*H01M 4/02* (2006.01)
*H01M 10/052* (2010.01)

(52) U.S. Cl.
CPC ........... *C01G 53/006* (2013.01); *C01G 53/42* (2013.01); *C01G 53/50* (2013.01); *H01M 4/366* (2013.01); *H01M 4/505* (2013.01); *H01M 4/525* (2013.01); *H01M 10/0525* (2013.01); *C01P 2002/50* (2013.01); *C01P 2002/52* (2013.01); *C01P 2002/72* (2013.01); *C01P 2002/85* (2013.01); *C01P 2004/03* (2013.01); *C01P 2004/04* (2013.01); *C01P 2006/40* (2013.01); *H01M 10/052* (2013.01); *H01M 2004/028* (2013.01)

(56) References Cited

U.S. PATENT DOCUMENTS

| | | |
|---|---|---|
| 2016/0276658 A1 | 9/2016 | Choi et al. |
| 2016/0276660 A1 | 9/2016 | Choi et al. |
| 2017/0062824 A1* | 3/2017 | Kang ................ H01M 4/13 |

FOREIGN PATENT DOCUMENTS

| | | |
|---|---|---|
| JP | 1995122261 A | 5/1995 |
| JP | 2008103204 A | 5/2008 |
| KR | 1020150049288 A | 5/2015 |
| KR | 1020150049289 A | 5/2015 |
| KR | 1020150063954 A | 6/2015 |
| KR | 1020150063956 A | 6/2015 |

OTHER PUBLICATIONS

Hang Hu, et al., "Zirconium phosphate wrapped LiMn1.5Ni0.5O4 used in lithium ion batteries as high voltage cathode material", Applied Surface Science, v. 316 (2014), pp. 348-354.

Kwangjin Park, et al., "Enhancement in the electrochemical performance of zirconium/phosphate bi-functional coatings on LiNi0.8Co0.15Mn0.05O2 by the removal of Li residuals", Phys. Chem. Chem. Phys., 2016, v. 18, pp. 29076-29085.

Xiaoping Zhang, et al., "Zr-containing phosphate coating to enhance the electrochemical performances of Li-rich layer-structured Li[Li0.2Ni0.17Co0.07Mn0.56]O2", Electrochimica Acta, v. 193 (2016), pp. 96-103.

* cited by examiner

COMPOSITE CATHODE ACTIVE MATERIAL FOR LITHIUM BATTERY, CATHODE FOR LITHIUM BATTERY INCLUDING THE SAME, AND LITHIUM BATTERY INCLUDING THE CATHODE

CROSS-REFERENCE TO RELATED APPLICATION

This application claims priority to and the benefit of Korean Patent Application No. 10-2016-0075839, filed on Jun. 17, 2016, in the Korean Intellectual Property Office, and all the benefits accruing therefrom under 35 U.S.C. § 119, the content of which is incorporated herein in its entirety by reference.

BACKGROUND

1. Field

The present disclosure relates to a composite cathode active material for a lithium battery, a cathode for a lithium battery including the same, and a lithium battery including the cathode.

2. Description of the Related Art

Lithium batteries are used as a power source in automobiles as well as portable electronic devices. Accordingly, extensive research has been conducted into improving the capacity of such lithium batteries. In addition, as the types of devices become more complex and higher functioning, it is important that the lithium batteries used as the energy source of such devices increasingly have a high voltage in addition to a smaller size and a lighter weight.

Therefore, there remains a need to develop a cathode active material with high capacity and excellent cycle characteristics.

SUMMARY

Provided is a composite cathode active material for lithium batteries which has enhanced electrochemical performance.

Provided are methods of preparing the composite cathode active material.

Provided also is a cathode for lithium batteries which includes the composite cathode active material.

Provided is a lithium battery including the cathode and which exhibits an enhanced capacity retention rate.

According to an aspect of an embodiment, a composite cathode active material for a lithium battery includes a lithium composite oxide and a coating a layer disposed on at least a portion of the lithium composite oxide; and a coating layer disposed on at least a portion of the lithium composite oxide and including a composite including $ZrP_2O_7$ and $LiZr_2(PO_4)_3$, wherein the composite including $ZrP_2O_7$ and $LiZr_2(PO_4)_3$ is a reaction product of an acid-treated zirconium precursor, a phosphorus precursor, and the lithium composite oxide.

According to an aspect of another embodiment, a method of preparing the composite cathode active material includes: providing an acidic zirconium precursor mixture including a zirconium precursor, a solvent, and an acid; providing a phosphorus precursor mixture including a phosphorus precursor and a solvent; mixing a lithium composite oxide with the acidic zirconium precursor mixture and the phosphorus precursor mixture; drying the mixture of the lithium composite oxide, the acidic zirconium precursor mixture, and the phosphorus precursor mixture to form a dried product; and heat-treating the dried product to prepare the composite cathode active material, wherein the composite cathode active material comprises: a lithium composite oxide; and a coating layer disposed on at least a portion of the lithium composite oxide and comprising a composite comprising $ZrP_2O_7$ and $LiZr_2(PO_4)_3$.

According to an aspect of another embodiment, a cathode includes the composite cathode active material.

According to an aspect of another embodiment, a lithium battery includes the cathode.

Additional aspects will be set forth in part in the description which follows and, in part, will be apparent from the description, or may be learned by practice of the presented embodiments.

BRIEF DESCRIPTION OF THE DRAWINGS

These and/or other aspects will become apparent and more readily appreciated from the following description of the embodiments, taken in conjunction with the accompanying drawings in which.

DETAILED DESCRIPTION

Figure 1A:
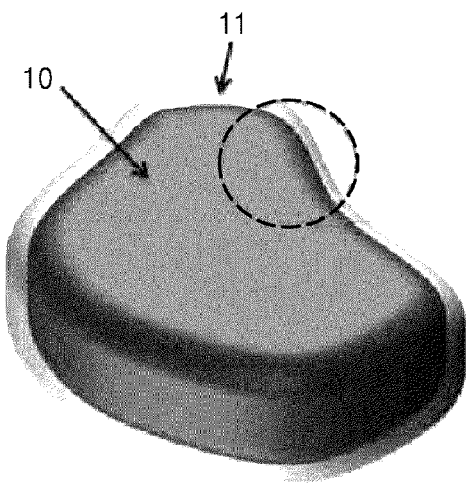
FIG. 1A is a schematic view illustrating a structure of a composite cathode active material for a lithium battery, according to an embodiment.

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects. Like reference numerals refer to like elements throughout.

It will be understood that when an element is referred to as being "on" another element, it can be directly on the other element or intervening elements may be present therebetween. In contrast, when an element is referred to as being "directly on" another element, there are no intervening elements present.

It will be understood that, although the terms "first," "second," "third" etc. may be used herein to describe various elements, components, regions, layers, and/or sections, these elements, components, regions, layers, and/or sections should not be limited by these terms. These terms are only used to distinguish one element, component, region, layer or section from another element, component, region, layer, or section. Thus, "a first element," "component," "region," "layer," or "section" discussed below could be termed a second element, component, region, layer, or section without departing from the teachings herein.

The terminology used herein is for the purpose of describing particular embodiments only and is not intended to be limiting. As used herein, the singular forms "a," "an," and "the" are intended to include the plural forms, including "at least one," unless the content clearly indicates otherwise. "Or" means "and/or." As used herein, the term "and/or" includes any and all combinations of one or more of the associated listed items. Expressions such as "at least one of," when preceding a list of elements, modify the entire list of elements and do not modify the individual elements of the list. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The exemplary term "lower," can therefore, encompasses both an orientation of "lower" and "upper," depending on the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10%, 5% of the stated value.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

Hereinafter, a composite cathode active, methods of preparing the composite cathode active, a cathode including the composite cathode active material, and a lithium battery including the cathode, will be described in more detail with reference to the accompanying drawings.

According to an embodiment of the present disclosure, a composite cathode active material for a lithium battery includes: a lithium composite oxide; and a coating layer disposed on at least a portion of the lithium composite oxide and including a composite including $ZrP_2O_7$ and $LiZr_2(PO_4)_3$, in which the composite is a reaction product of an acid-treated zirconium precursor, a phosphorus precursor, and the lithium composite oxide.

The composite is a zirconium (Zr) and phosphorus (P)-containing compound and is a reaction product formed by heat-treating a mixture of the acid-treated zirconium precursor, the phosphorus precursor, and the lithium composite. For example, the composite is obtained by treating the surface of the lithium composite oxide with a zirconium precursor and a phosphorus precursor and heating the surface-treated lithium composite oxide.

The heat treatment process may be performed at about 700° C. or greater, for example, from about 700° C. to about 1,000° C., or from about 750° C. to about 1,000° C., or from about 800° C. to about 1,000° C.

The term "composite" as used herein refers to a material formed by combining two or more constituent materials having different physical and/or chemical properties, wherein the composite has properties different from each material constituting the composite, and wherein each material remains separate and distinct at the macroscopic or microscopic level within the finished structure of the composite.

Lithium batteries are used as a power source in portable small-scale secondary batteries and in medium- and large-scale secondary batteries, such as those used in electric vehicles, power storage systems, and the like. As a cathode active material for such a lithium battery, $LiCoC_2$ is widely used, but has limitations in terms of energy density and power output characteristics due to the relatively low reversible capacity of the material, which is 200 mAhg$^{-1}$ or less. In particular, the use of the cathode active material is limited in high-energy density applications due to the structural instability of the material during overcharging and the structural deformation which occurs as a result of the overcharging. Therefore, there is a need to develop a cathode active material for a lithium battery which exhibits a high energy density and a long lifespan.

Among layered lithium composite oxides, a three-component layered oxide containing Ni in an amount of about 70 mole percent (mol %) or more, for example, about 80 mol % or more, has a greater reversible capacity than $LiCoO_2$. A transition metal of a layered lithium transition metal composite oxide may be, for example, manganese (Mn), iron (Fe), nickel (Ni), cobalt (Co), vanadium (V), chromium (Cr), or the like. Thus, such layered lithium composite oxides are suitable for use as a cathode active material for a secondary battery with high energy density. However, as charging and discharging processes proceed, a decrease in capacity and voltage drop occur due to rapid degradation of an electrode according to an oxidation number of a central transition metal and crystal structure transition during charging and discharging, which is a significant obstacle to the commercialization of the layered lithium metal composite oxide. Methods of forming a coating layer on a layered cathode active material have been shown to be effective to suppress reaction between the cathode active material and an electrolyte and to increase lithium ion reaction stability in the structure of the cathode active material. However, the aforementioned coating layer formation methods are not sufficient to address the problems described above related to the layered lithium metal composite oxide, and thus there is still room for improvement.

The inventors have advantageously discovered that when a lithium composite oxide, which is formed by coating a surface of a layered lithium transition metal composite oxide with a composite containing Zr and P, is used as a cathode active material, electrochemical performance of the lithium battery is enhanced, for example, capacity, lifespan, and the like may be improved.

The coating layer comprising a composite containing Zr and P, e.g., a composite including $ZrP_2O_7$ and $LiZr_2(PO_4)_3$, may be formed, for example, using a wet coating process which uses deionized water with a high solubility for residual (e.g., free) lithium and using an acid treatment.

The amount of the composite in the composite cathode active material may be, from about 0.1 weight percent (wt %) to about 10 wt %, for example, from about 0.2 wt % to about 7.5 wt %, for example, from about 0.5 wt % to about 2 wt %, based on the total weight of the composite cathode active material. When the amount of the composite is within the ranges described above, a lithium battery having enhanced capacity retention rate and capacity characteristics may be manufactured.

The content of phosphorus in the composite may be from about 0.1 mole (mol) to about 10 mol, for example, from about 0.2 mol to about 6 mol, for example, from about 0.25 mol to about 4 mol, based on 1 mol of zirconium. When the content of phosphorus in the composite is within the above ranges, a lithium battery including a lithium composite oxide having a coating layer including the composite, exhibits high capacity retention rate and excellent capacity characteristics.

The amount of $ZrP_2O_7$ in the composite may be from about 0.2 mol to about 2 mol, for example, from about 0.2 mol to about 0.7 mol, for example, from about 0.2 mol to about 0.5 mol, based on 1 mol of $LiZr_2(PO_4)_3$.

A ratio of $ZrP_2O_7$ and $LiZr_2(PO_4)_3$ may be confirmed by comparing an intensity of a peak corresponding to $ZrP_2O_7$ and an intensity of a peak corresponding to $LiZr_2(PO_4)_3$, as determined by X-ray diffraction (XRD) analysis. The peak corresponding to $ZrP_2O_7$ (peak A) appears at a diffraction angle of about 18° to about 19° two-theta (2θ), and the peak corresponding to $LiZr_2(PO_4)_3$ (peak B) appears at a diffraction angle 2θ of about 19.5° to about 20.5° 2θ.

The peak A has a weaker intensity than that of the peak B. When the intensity of the peak B is 1, the intensity of the peak A is from about 0.2 to about 0.7, for example, for example, from about 0.2 to about 0.6, for example, from about 0.2 to about 0.5, based on a peak B intensity of 1.

The composite of the coating layer may further include at least one selected from $Li_2ZrP_2O_8$, $Zr_2P_2O_9$, $ZrO_2$, and $Li_2ZrO_3$. The amount of the at least one selected from $Li_2ZrP_2O_8$, $Zr_2P_2O_9$, $ZrO_2$, and $Li_2ZrO_3$ may be from about 0.01 mol to about 2 mol, or from about 0.05 mol to about 2 mol, or from about 0.1 mol to about 2 mol, based on 1 mol of $LiZr_2(PO_4)_3$.

In the composite, $LiZr_2(PO_4)_3$ may be primarily present in an area adjacent to the lithium composite oxide.

The lithium composite oxide may be, for example, a layered oxide, an olivine-containing oxide, or a spinel-phase oxide. The lithium composite oxide may be at least one selected from compounds represented by Formulae 1 to 6 below:

$$Li_aNi_xCo_yMn_zM_cO_{2-e}A_e \qquad \text{Formula 1}$$

wherein, in Formula 1, $1.0 \leq a \leq 1.4$, $0<x<1$, $0 \leq y<1$, $0<z<1$, $0 \leq c<1$, $0<x+y+z+c \leq 1$, and $0 \leq e<1$; M is at least one selected from V, magnesium (Mg), gallium (Ga), silicon (Si), tungsten (W), molybdenum (Mo), Fe, Cr, copper (Cu), zinc (Zn), titanium (Ti), aluminum (Al), and boron (B); and A is at least one anion element selected from fluorine (F), sulfur (S), chlorine (Cl), and bromine (Br), $$Li[Co_{1-x}M_x]O_{2-b}A_b \qquad \text{Formula 2}$$

wherein, in Formula 2, $0 \leq b \leq 0.1$, and $0 \leq x \leq 0.1$; M is at least one metal selected from Mg, Al, Ni, Mn, Zn, Fe, Cr, Ga, Mo, and W; and A is at least one anion element selected from F, S, Cl, and Br, $$Li_{1+a}[Ni_{1-x}M_x]O_{2-b}A_b \qquad \text{Formula 3}$$

wherein, in Formula 3, $0 \leq a \leq 0.2$, $0 \leq b \leq 0.1$, and $0.01 \leq x \leq 0.5$; M is at least one metal selected from Mg, Al, Co, Mn, Zn, Fe, Cr, Ga, Mo, and W; and A is at least one anion element selected from F, S, Cl, and Br, $$Li_{1+a}[Mn_{2-x}M_x]O_{4-b}A_b \qquad \text{Formula 4}$$

wherein, in Formula 4, $0 \leq a \leq 0.15$, $0 \leq b \leq 0.1$, and $0 \leq x \leq 0.1$; A is at least one anion element selected from F, S, Cl, and Br; and M is at least one selected from Co, Ni, Cr, Mg, Al, Zn, Mo, and W, $$LiM_xFe_{1-x}PO_4 \qquad \text{Formula 5}$$

wherein, in Formula 5, M is at least one metal selected from Co, Ni, and Mn; and $0 \leq x \leq 1$, $$Li_{1-a}[Ni_{0.5}Mn_{1.5-x}M_x]O_{4-b}A_b \qquad \text{Formula 6}$$

wherein, in Formula 6, $0 \leq a \leq 0.15$, $0 \leq b \leq 0.1$, and $0 \leq x \leq 0.1$; A is at least one anion element selected from F, S, Cl, and Br; and M is at least one metal selected from Co, Ni, Cr, Mg, Al, Zn, Mo, and W.

In Formulae 3 to 6 above, a may be, for example, 0.01 to 0.15.

The lithium composite oxide may be at least one selected from compounds represented by Formula 7 below:

$$Li_aNi_xCo_yMn_zM_cO_{2-b}A_b \qquad \text{Formula 7}$$

wherein, in Formula 7, $1.0 \leq a \leq 1.4$, $0<x<1$, $0 \leq y<1$, $0<z<1$, $0 \leq c<1$, $0<x+y+z+c \leq 1$, and $0 \leq b \leq 0.1$; M is at least one selected from V, Mg, Ga, Si, W, Mo, Fe, Cr, Cu, Zn, Ti, Al, and B; and A is at least one anion element selected from F, S, Cl, and Br.

The lithium composite oxide may be a layered compound represented by Formula 8 below:

$$Li_aNi_xCo_yMn_zO_{2-b}A_b \qquad \text{Formula 8}$$

wherein, in Formula 8, $1.0 \leq a \leq 1.4$, $0.7 \leq x<1$, $0 \leq y<1$, $0<z<1$, $0 \leq c<1$, $0<x+y+z \leq 1$, and $0 \leq b \leq 0.1$; M is at least one selected from V, Mg, Ga, Si, W, Mo, Fe, Cr, Cu, Zn, Ti, Al, and B; and A is at least one anion element selected from F, S, Cl, and Br.

In Formula 8 above, $0<y \leq 0.3$ and $0.05 \leq z \leq 0.1$.

In Formulae 7 and 8 above, x may be, for example, 0.7 to 0.95, for example, 0.75 to 0.95, for example, 0.8 to 0.95, y may be 0.1 to 0.2, and z may be 0.05 to 0.1.

The compound of Formula 8 is a compound having a relatively high amount of nickel, has high capacity properties, and may be prepared at a low cost. In addition, the compound of Formula 8 may exhibit enhanced capacity and capacity retention rate at a high operating temperature (e.g., about 45° C. or greater) and a high operating voltage (e.g., about 4 V or greater, for example, about 4.5 V).

The lithium composite oxide may be a layered compound represented by Formula 8a below:

$$Li_aNi_xCO_yMn_zM_cO_2 \qquad \text{Formula 8a}$$

wherein, in Formula 8a, $1.0 \leq a \leq 1.4$, $0.8 \leq x<1$, $0 \leq y<1$, $0<z<1$, $0 \leq c<1$, $0<x+y+z+c \leq 1$, and $0 \leq b \leq 0.1$; M is at least one selected from V, Mg, Ga, Si, W, Mo, Fe, Cr, Cu, Zn, Ti, Al, and B; and A is at least one anion element selected from F, S, Cl, and Br.

The lithium composite oxide may be, for example, at least one selected from: $Li_{1.015}Ni_{0.8}CO_{0.15}Mn_{0.05}O_2$, $Li_{1.015}Ni_{0.8}CO_{0.1}Mn_{0.1}O_2$, $Li_{1.015}Ni_{0.7}CO_{0.2}Mn_{0.1}O_2$, $Li_{1.015}Ni_{0.7}CO_{0.25}Mn_{0.05}O_2$, $Li_{1.015}Ni_{0.9}CO_{0.05}Mn_{0.05}O_2$, $Li_{1.015}Ni_{0.91}Co_{0.06}Mn_{0.03}O_2$, $Li_{1.015}Ni_{0.88}Co_{0.06}Mn_{0.06}O_2$, $Li_{1.08}Ni_{0.8}Co_{0.15}Mn_{0.05}O_2$, $Li_{1.08}Ni_{0.8}Co_{0.1}Mn_{0.1}O_2$, $Li_{1.08}Ni_{0.7}Co_{0.2}Mn_{0.1}O_2$, $Li_{1.08}Ni_{0.7}Co_{0.25}Mn_{0.05}O_2$, $Li_{1.08}Ni_{0.9}Co_{0.05}Mn_{0.05}O_2$, $Li_{1.08}Ni_{0.91}Co_{0.06}Mn_{0.03}O_2$, $Li_{1.08}Ni_{0.88}Co_{0.06}Mn_{0.06}O_2$, $LiNi_{0.8}Co_{0.15}Mn_{0.05}O_2$, $LiNi_{0.8}CO_{0.1}Mn_{0.1}O_2$, $LiNi_{0.7}CO_{0.2}Mn_{0.1}O_2$, $LiNi_{0.7}Co_{0.25}Mn_{0.05}O_2$, $LiNi_{0.9}Co_{0.05}Mn_{0.05}O_2$, $LiNi_{0.91}Co_{0.06}Mn_{0.03}O_2$, $LiNi_{0.88}CO_{0.06}Mn_{0.06}O_2$, $Li_{1.1}Ni_{0.8}Co_{0.15}Mn_{0.05}O_2$, $Li_{1.1}Ni_{0.8}Co_{0.1}Mn_{0.1}O_2$, $Li_{1.1}Ni_{0.7}Co_{0.2}Mn_{0.1}O_2$, $Li_{1.1}Ni_{0.7}Co_{0.25}Mn_{0.05}O_2$, $Li_{1.1}Ni_{0.9}Co_{0.05}Mn_{0.05}O_2$, $Li_{1.1}Ni_{0.91}Co_{0.06}Mn_{0.03}O_2$, $Li_{1.1}Ni_{0.88}Co_{0.06}Mn_{0.06}O_2$, $Li_{1.15}Ni_{0.8}Co_{0.15}Mn_{0.05}O_2$, $Li_{1.15}Ni_{0.8}CO_{0.1}Mn_{0.1}O_2$, $Li_{1.15}Ni_{0.7}Co_{0.2}Mn_{0.1}O_2$, $Li_{1.15}Ni_{0.7}Co_{0.25}Mn_{0.05}O_2$, $Li_{1.15}Ni_{0.9}Co_{0.05}Mn_{0.05}O_2$, $Li_{1.15}Ni_{0.91}CO_{0.06}Mn_{0.03}O_2$, $Li_{1.15}Ni_{0.88}CO_{0.06}Mn_{0.06}O_2$, $Li_{1.2}Ni_{0.8}Co_{0.15}Mn_{0.05}O_2$, $Li_{1.2}Ni_{0.8}CO_{0.1}Mn_{0.1}O_2$, $Li_{1.2}Ni_{0.7}CO_{0.2}Mn_{0.1}O_2$, $Li_{1.2}Ni_{0.7}Co_{0.25}Mn_{0.05}O_2$, $Li_{1.2}Ni_{0.9}Co_{0.05}Mn_{0.05}O_2$, $Li_{1.2}Ni_{0.91}Co_{0.06}Mn_{0.03}O_2$, $Li_{1.2}Ni_{0.88}Co_{0.06}Mn_{0.06}O_2$, $Li_{1.3}Ni_{0.8}Co_{0.15}Mn_{0.05}O_2$, $Li_{1.3}Ni_{0.8}CO_{0.1}Mn_{0.1}O_2$, $Li_{1.3}Ni_{0.7}CO_{0.2}Mn_{0.1}O_2$, $Li_{1.3}Ni_{0.7}Co_{0.25}Mn_{0.05}O_2$, $Li_{1.3}Ni_{0.9}Co_{0.05}Mn_{0.05}O_2$, $Li_{1.3}Ni_{0.91}Co_{0.06}Mn_{0.03}O_2$, $Li_{1.3}Ni_{0.88}Co_{0.06}Mn_{0.06}O_2$, $Li_{1.4}Ni_{0.8}Co_{0.15}Mn_{0.05}O_2$, $Li_{1.4}Ni_{0.8}CO_{0.1}Mn_{0.1}O_2$, $Li_{1.4}Ni_{0.7}CO_{0.2}Mn_{0.1}O_2$, $Li_{1.4}Ni_{0.7}Co_{0.25}Mn_{0.05}O_2$, $Li_{1.4}Ni_{0.9}Co_{0.05}Mn_{0.05}O_2$, $Li_{1.4}Ni_{0.91}Co_{0.06}Mn_{0.03}O_2$, $Li_{1.4}Ni_{0.88}Co_{0.06}Mn_{0.06}O_2$, $Li_{1.5}Ni_{0.8}Co_{0.15}Mn_{0.05}O_2$, $Li_{1.5}Ni_{0.8}CO_{0.1}Mn_{0.1}O_2$, $Li_{1.5}Ni_{0.7}CO_{0.2}Mn_{0.1}O_2$, $Li_{1.5}Ni_{0.7}Co_{0.25}Mn_{0.05}O_2$, $Li_{1.5}Ni_{0.9}Co_{0.05}Mn_{0.05}O_2$, $Li_{1.15}Ni_{0.91}Co_{0.06}Mn_{0.03}O_2$, and $Li_{1.5}Ni_{0.88}CO_{0.06}Mn_{0.06}O_2$.

Figure 1B:
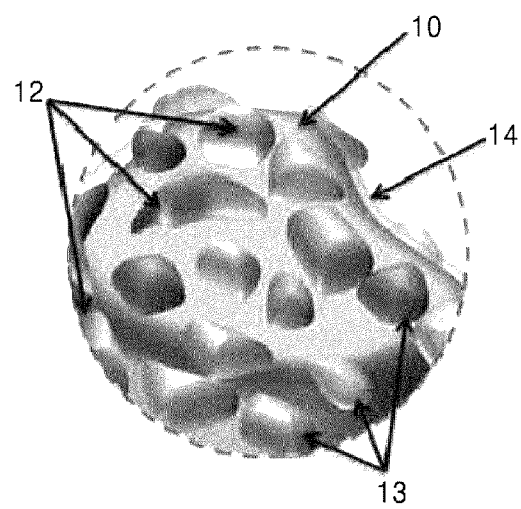
FIG. 1B is an enlarged view of the indicated portion of FIG. 1A.

FIGS. 1A and 1B are a schematic view illustrating a structure of a composite cathode active material according to an embodiment.

The composite cathode active material has a structure in which a coating layer 11 is disposed on an upper portion of a lithium composite oxide 10. The coating layer 11 includes a composite including zirconium and phosphorus, and the composite includes $ZrP_2O_7$ 12 and $LiZr_2(PO_4)_3$ 13. The composite cathode active material may include only trace amounts of residual (e.g., free) lithium 14 or, as illustrated in FIG. 1B, may include only a very small amount of free lithium 14.

The coating layer 11 may be in a form of a continuous film on the surface of the lithium composite oxide 10 (e.g., a film having a continuous shape and formed on the entire surface of the lithium composite oxide 10). The continuity of the continuous film shape may be confirmed using a scanning electron microscope. When the coating layer 11 is a continuous film, a direct reaction between the lithium composite oxide 10 and an electrolyte may be effectively suppressed.

A total thickness of the coating layer 11 may be from about 1 nm to about 1 μm, for example, from about 5 nm to about 500 nm, for example, from about 10 nm to about 100 nm. When the total thickness of the coating layer 11 is within the above ranges, a lithium battery with enhanced capacity retention rate and capacity characteristics may be manufactured.

The coating layer 11 may include a composite including $ZrP_2O_7$ and $LiZr_2(PO_4)_3$, a composite including $ZrP_2O_7$, $LiZr_2(PO_4)_3$, and $Li_2ZrP_2O_8$, a composite including $ZrP_2O_7$, $LiZr_2(PO_4)_3$, $Li_2ZrP_2O_8$, and $Zr_2P_2O_9$, a composite including $ZrP_2O_7$, $LiZr_2(PO_4)_3$, $Li_2ZrP_2O_8$, $Zr_2P_2O_9$, and $ZrO_2$, or a composite including $LiZr_2(PO_4)_3$, $Li_2ZrP_2O_8$, $Zr_2P_2O_9$, $ZrO_2$, and $Li_2ZrO_3$.

The composite cathode active material has a coating layer obtained by reacting an acid-treated zirconium precursor, a phosphorus precursor, and the lithium composite oxide. Due to the presence of the coating layer, a high-capacity layered lithium composite oxide is formed having enhanced electrochemical performance. Through the acid treatment of the zirconium precursor, and while not wanting to be bound by theory, it is understood that residual (e.g., free) lithium present in the lithium composite oxide is removed. As a result, when the composite cathode active material is used, a lithium battery with enhanced capacity retention rate may be manufactured.

The composite cathode active material may have an average particle diameter of about 10 nm to about 500 μm, for example, about 20 nm to about 100 μm, for example, about 1 μm to about 30 μm. When the average particle diameter of the composite cathode active material is within the ranges described above, a lithium battery with enhanced physical characteristics may be obtained.

The composite cathode active material may have a tap density of about 0.5 grams per cubic centimeter (g/cm$^3$) to about 3 g/cm$^3$, for example, about 0.5 g/cm$^3$ to about 2.5 g/cm$^3$, for example, about 0.5 g/cm$^3$ to about 2.0 g/cm$^3$. When the composite cathode active material having the above tap density range is used, a lithium battery with enhanced voltage and lifespan characteristics may be obtained.

The coating layer disposed on the surface of the composite cathode active material may further include a conductive material. The conductive material may be at least one selected from a carbonaceous material, a conductive polymer, indium tin oxide (ITO), $RuO_2$, and ZnO.

The carbonaceous material may comprise at least one selected from crystalline carbon and amorphous carbon. The crystalline carbon may comprise graphite, such as natural graphite or artificial graphite, that is in an amorphous, plate, flake, spherical, or fibrous form, and the amorphous carbon may comprise at least one selected from soft carbon (carbon calcined at low temperatures), hard carbon, a mesophase pitch carbide, a calcined coke, graphene, carbon black, fullerene soot, carbon nanotubes, carbon fiber, and the like. However, the crystalline and amorphous carbon are not particularly limited to the above examples and any suitable crystalline and/or amorphous carbon that may be suitably used as a carbonaceous material may be used.

Non-limiting examples of the carbonaceous material include at least one selected from carbon nanotubes, fullerene, graphene, and carbon fibers. The conductive polymer may comprise at least one selected from polyaniline, polythiophene, and polypyrrole.

Figure 2:
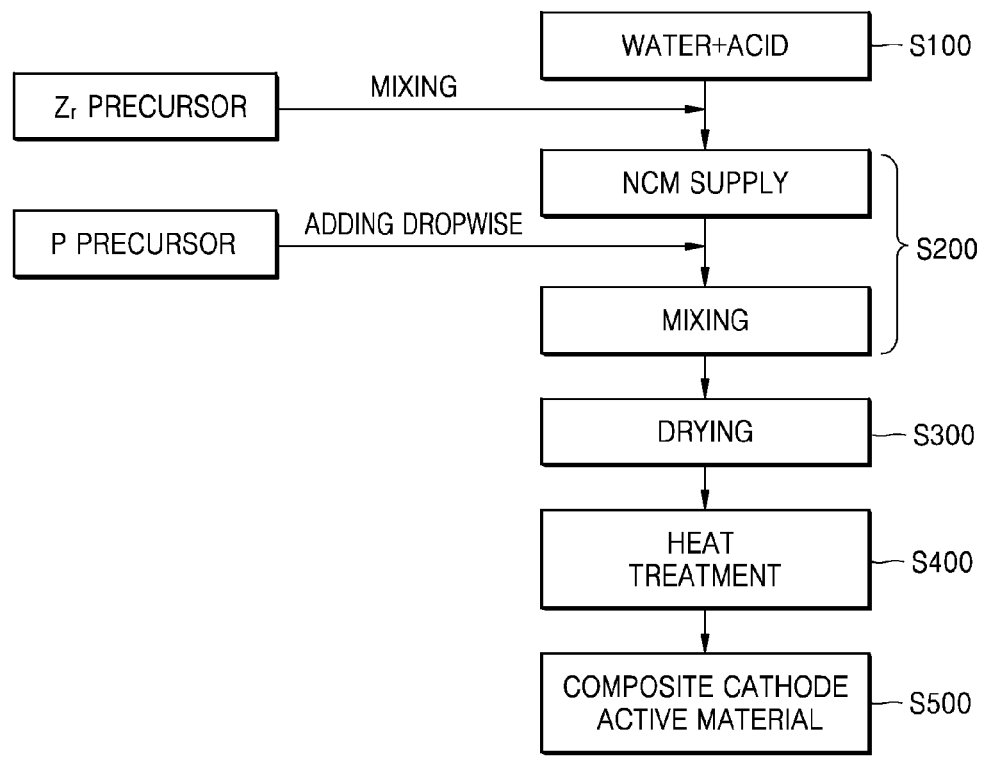
FIG. 2 is a flowchart explaining a process of preparing a composite cathode active material, according to an embodiment.

Hereinafter, a method of preparing the composite cathode active material, according to an embodiment will be further described with reference to FIG. 2.

A zirconium precursor is mixed with an acid and a solvent to obtain a zirconium precursor mixture. This process may be performed by simultaneously mixing a zirconium precursor, an acid, and a solvent together. In another embodiment, as illustrated in FIG. 2, the zirconium precursor mixture may be obtained by mixing an acid and a solvent to obtain an acid solution and mixing the acid solution with a zirconium precursor (S100). When the latter method is used, a zirconium precursor mixture with a more uniform composition may be obtained.

Subsequently, a phosphorus precursor is mixed with a solvent to obtain a phosphorus precursor mixture.

The solvent used to prepare the zirconium precursor mixture and the phosphorus precursor mixture may be deionized water, an alcohol-based solvent such as a solvent comprising methanol or ethanol, or the like.

The acid may comprise at least one selected from nitric acid, hydrochloric acid, sulfuric acid, and the like. The amount of the acid may be adjusted such that pH of the zirconium precursor mixture is about 5 or less, for example, a pH of about 1 to about 4.5, for example, a pH of about 1 to about 3.5. A mixing weight ratio of the solvent to the acid may be from about 1:0.01 to about 1:1, or about 1:0.05 to about 1:1, or about 1:0.1, and the amount of the solvent may be about 2 times or less than the weight of the lithium composite oxide, for example, about 0.5 times to about 2 times, or about 0.5 times to about 1.8 times, or about 0.5 times to about 1.5 times, the weight of the lithium composite oxide.

If the zirconium precursor is mixed with solvent (e.g., deionized water) alone without an acid, the zirconium precursor may not dissolved or dispersed in the solvent, but instead floats therein, e.g., to provide a dispersion. Thus, in a subsequent process of mixing such a zirconium precursor with the phosphorus precursor mixture, which will be further described below, it may be difficult to mix the zirconium precursor and the phosphorus precursor and to implement a reaction between the zirconium precursor and the phosphorus precursor.

The zirconium precursor may comprise, for example, at least one selected from zirconium oxynitrate ($(ZrO(NO_3)_2 \cdot 4H_2O)$, zirconium chloride ($ZrCl_2$), zirconium acetate ($C_8H_{12}O_8Zr$), zirconium hydroxide ($ZrO_2 \cdot 2H_2O$), and zirconium nitride (ZrN).

The zirconium precursor mixture, which is acidic, and the phosphorus precursor mixture may be mixed with the lithium composite oxide (NCM) to obtain a composition for forming a composite cathode active material. In this regard, the mixing process may be performed at a temperature of about 25° C. to about 90° C., for example, about 30° C. to about 85° C., for example, about 35° C. to about 75° C.

The lithium composite oxide, the zirconium precursor mixture, and the phosphorus precursor mixture may be simultaneously mixed together. In another embodiment, as illustrated in FIG. 2, the lithium composite oxide ("NCM") may be mixed with the zirconium precursor mixture and then the resulting mixture may be added to the phosphorus precursor mixture, and the components are mixed together (S200). In another embodiment, the lithium composite oxide and the phosphorus precursor mixture may be mixed together and then the zirconium precursor mixture may be added to the resulting mixture.

Among the mixing processes described above, when the process of mixing the lithium composite oxide and the zirconium precursor mixture together and then adding the phosphorus precursor mixture to the resulting mixture is used (S200), the composition for forming a composite cathode active material may have a more uniform composition.

The phosphorus precursor may comprise, for example, at least one selected from ammonium phosphate (($NH_4$)$_2$$HPO_4$), triammonium phosphate trihydrate (($NH_4$)$_3$$PO_4 \cdot H_2O$), ammonium dihydrogen phosphate ($NH_4H_2PO_4$), and phosphoric acid ($H_3PO_4$).

The composite obtained according to the processes described above may be dried to remove the deionized water, the acid, and the like existing therein (S300). The drying process may be performed at a temperature of about 30° C. to about 150° C., for example, about 50° C. to about 140° C., for example, about 60° C. to about 130° C. In the drying process, the solvent, the acid, and the like may be removed.

The product obtained after the drying process may be heat-treated under an oxidative gas atmosphere to obtain a composite cathode active material including: a lithium composite oxide; and a coating layer disposed on a surface of the lithium composite oxide and including a composite including zirconium and phosphorus (S400 and S500).

The heat treatment process may be performed at a temperature of about 700° C. to about 1200° C., for example, about 700° C. to about 1000° C., for example, about 720° C. to about 900° C. When the heat treatment temperature is within the above ranges, a desired composite cathode active material may be obtained through a reaction between residual lithium of the lithium composite oxide, the zirconium precursor, and the phosphorus precursor.

The oxidative gas atmosphere may include, for example, oxygen, air, or the like.

In the method of preparing the composite cathode active material, a step of filtering and/or washing the mixture of lithium composite oxide, the zirconium precursor, and the phosphorus precursor with water may be omitted, e.g., may not be performed before the drying process. If the filtering and/or washing processes are performed, the zirconium precursor and the phosphorus precursor as starting materials are removed through the filtering and/or washing processes, and thus it is difficult to obtain a desired composite cathode active material.

The lithium composite oxide described above may be prepared using a general method of preparing a lithium composite oxide. The lithium composite oxide may be prepared according to the following method. In the preparation method described below, a case in which nickel-cobalt-manganese hydroxide is used as a precursor for forming the lithium composite oxide will be described as an example. Other lithium composite oxides, for example, nickel-cobalt-manganese carbonate, nickel-cobalt-manganese oxalate, or the like, may also be used as a precursor for forming the lithium composite oxide.

When the lithium composite oxide comprises at least one selected from the compounds of Formulae 1 to 8 and 8a, a corresponding precursor for forming the lithium composite oxide may be used.

First, nickel-cobalt-manganese hydroxide is prepared by co-precipitation using a nickel precursor, a cobalt precursor, and a manganese precursor.

In this regard, a solid-phase method or the like may be used, and any other method which is suitable for use in lithium batteries may also be used.

The nickel precursor may comprise, for example, at least one selected from nickel nitrate, nickel acetate, nickel chloride, nickel sulfate, nickel phosphate, and the like. The cobalt precursor may comprise at least one selected from cobalt nitrate, cobalt acetate, cobalt chloride, cobalt sulfate, cobalt phosphate, and the like. The manganese precursor may comprise at least one selected from manganese chloride, manganese nitrate, manganese acetate, and the like. The amounts of the nickel precursor, the cobalt precursor, and the manganese precursor used to prepare nickel-cobalt-manganese hydroxide are stoichiometrically adjusted to obtain a desired composite cathode active material.

A lithium compound may be added to nickel-cobalt-manganese hydroxide and mixed therein and the mixture may be heat-treated to obtain a lithium composite oxide. The lithium compound may comprise, for example, at least one selected from lithium carbonate ($Li_2CO_3$), lithium sulfate ($Li_2SO_4$), lithium nitrate ($LiNO_3$), lithium hydroxide (LiOH), and the like.

In the preparation of the lithium composite oxide, the heat treatment process may be performed at a temperature of about 400° C. to about 1500° C., for example, about 400° C. to about 1200° C., for example, about 700° C. to about 900° C., in either an inert gas atmosphere or in an oxidative gas atmosphere.

The inert gas atmosphere may include, for example, at least one selected from nitrogen, argon, and helium, and the oxidative gas atmosphere may include, for example, at least one selected from oxygen, air, and the like.

The co-precipitation using a nickel precursor, a cobalt precursor, and a manganese precursor will be further described as follows.

First, a nickel precursor, a cobalt precursor, and a manganese precursor are mixed with a solvent to obtain a precursor mixture. In this regard, the solvent may comprise at least one selected from water, an alcohol-based solvent, and the like. The alcohol-based solvent may comprise methanol, ethanol, or the like.

The amount of the solvent may be from about 200 parts by weight to about 3000 parts by weight, or from about 500 to about 2500 parts by weight, or from about 750 to about 2000 parts by weight, based on 100 parts by weight of the precursors. When the amount of the solvent is within the above ranges, a mixture, in which the nickel, cobalt, and manganese precursors are uniformly mixed, may be obtained. The mixing process may be performed at a temperature of, for example, about 20° C. to about 80° C., for example, about 25° C. to about 75° C., for example, about 30° C. to about 70° C., or for example, about 60° C.

A chelating agent and a pH adjuster may be added to the precursor mixture and the resulting mixture subjected to co-precipitation to obtain a precipitate. The precipitate may be filtered and heat-treated. The heat treatment process may be performed at a temperature of about 20° C. to about 110° C., or for example, about 30° C. to about 100° C., or for example, about 50° C. to about 90° C., or for example, about 80° C. When the heat treatment temperature is within the above ranges, the co-precipitation has high reactivity.

The chelating agent controls the rate of the precipitation reaction and may comprise at least one selected from ammonium hydroxide ($NH_4OH$), citric acid, and the like. The amount of the chelating agent may be determined by one of skill in the art without undue experimentation.

When sodium hydroxide is used as a pH adjuster to facilitate precipitation, a metal hydroxide represented by Formula 8a above may be obtained. When sodium carbonate is used as a pH adjuster, a metal carbonate represented by Formula 8b above may be obtained. When sodium oxalate is used as a pH adjuster, a metal oxalate represented by Formula 8d above may be obtained.

The pH adjuster adjusts the pH of the reaction mixture to be a pH of about 6 to about 12 and may be, for example, at least one selected from ammonium hydroxide, sodium hydroxide (NaOH), sodium carbonate ($Na_2CO_3$), sodium oxalate ($Na_2C_2O_4$), and the like.

According to another embodiment, a cathode includes the composite cathode active material described above.

According to another embodiment, a lithium battery includes the cathode.

A cathode may be prepared according to the following method.

A cathode active material composition, in which a cathode active material, a binder, and a solvent are mixed together, is prepared.

The cathode active material composition may further include a conducting agent.

The cathode active material composition may be directly coated on a current collector and dried to manufacture a cathode plate. In another embodiment, the cathode active material composition may be cast on a separate support and a film separated from the support may be laminated on a current collector, thereby completing the manufacture of a cathode plate.

The composite cathode active material described above may be used as the cathode active material. The cathode active material composition may further include a first cathode active material. The first cathode active material is a cathode active material commonly used in a lithium battery, and may be used in addition to the composite cathode active material.

The first cathode active material may include at least one selected from a lithium cobalt oxide, a lithium nickel cobalt manganese oxide, a lithium nickel cobalt aluminum oxide, a lithium iron phosphate, and a lithium manganese oxide. However, the first cathode active material is not particularly limited to the above examples and any suitable cathode active material may be used.

For example, the first cathode active material may comprise at least one selected from the compounds represented by any one of the following Formulae: $Li_aA_{1-b}B'_bD_2$ where $0.90 \leq a \leq 1.8$ and $0 \leq b \leq 0.5$; $Li_aE_{1-b}B'_bO_{2-c}D_c$ where $0.90 \leq a \leq 1.8$, $0 \leq b \leq 0.5$, and $0 \leq c \leq 0.05$; $LiE_{2-b}B'_bO_{4-c}D_c$ where $0 \leq b \leq 0.5$ and $0 \leq c \leq 0.05$; $Li_aNi_{1-b-c}Co_bB'_cD_\alpha$, where $0.90 \leq a \leq 1.8$, $0 \leq b \leq 0.5$, $0 \leq c \leq 0.05$, and $0 < \alpha \leq 2$; $Li_aNi_{1-b-c}Co_bB'_cO_{2-\alpha}F'_\alpha$ where $0.90 \leq a \leq 1.8$, $0 \leq b \leq 0.5$, $0 \leq c \leq 0.05$, and $0 < \alpha < 2$; $Li_aNi_{1-b-c}Co_bB'_cO_{2-\alpha}F'_\alpha$ where $0.90 \leq a \leq 1.8$, $0 \leq b \leq 0.5$, $0 \leq c \leq 0.05$, and $0 < \alpha < 2$; $Li_aNi_{1-b-c}Mn_bB'_cD_\alpha$ where $0.90 \leq a \leq 1.8$, $0 \leq b \leq 0.5$, $0 \leq c \leq 0.05$, and $0 < \alpha \leq 2$; $Li_aNi_{1-b-c}Mn_bB'_cO_{2-\alpha}F'_\alpha$ where $0.90 \leq a \leq 1.8$, $0 \leq b \leq 0.5$, $0 \leq c \leq 0.05$, and $0 < \alpha < 2$; $Li_aNi_{1-b-c}Mn_bB'_cO_{2-\alpha}F'_\alpha$ where $0.90 \leq a \leq 1.8$, $0 \leq b \leq 0.5$, $0 \leq c \leq 0.05$, and $0 < \alpha < 2$; $Li_aNi_bE_cG_dO_2$ where $0.90 \leq a \leq 1.8$, $0 \leq b \leq 0.9$, $0 \leq c \leq 0.5$, and $0.001 \leq d \leq 0.1$; $Li_aNi_bCo_cMn_dGeO_2$ where $0.90 \leq a \leq 1.8$, $0 \leq b \leq 0.9$, $0 \leq c \leq 0.5$, $0 \leq d \leq 0.5$, and $0.001 \leq e \leq 0.1$; $Li_aNiG_bO_2$ where $0.90 \leq a \leq 1.8$ and $0.001 \leq b \leq 0.1$; $Li_aCoG_bO_2$ where $0.90 \leq a \leq 1.8$ and $0.001 \leq b \leq 0.1$; $Li_aMnG_bO_2$ where $0.90 \leq a \leq 1.8$ and $0.001 \leq b \leq 0.1$; $Li_aMn_2GbO_4$ where $0.90 \leq a \leq 1.8$ and $0.001 \leq b \leq 0.1$; $QO_2$; $QS_2$; $LiQS_2$; $V_2O_5$; $LiV_2O_5$; $LiI'O_2$; $LiNiVO_4$; $Li_{(3-f)}J_2(PO_4)_3$ where $0 \leq f \leq 2$; $Li_{(3-f)}Fe_2(PO_4)_3$ where $0 \leq f \leq 2$; and $LiFePO_4$.

In the formulae above, A is at least one selected from Ni, Co, and Mn; B' is at least one selected from Al, Ni, Co, Mn, Cr, Fe, Mg, strontium (Sr), V, and a rare earth element; D is at least one selected from oxygen (O), F, sulfur (S), and phosphorous (P); E is at least one selected from Co and Mn; F' is at least one selected from F, S, and P; G is at least one selected from Al, Cr, Mn, Fe, Mg, lanthanum (La), cerium (Ce), Sr, and V; Q is at least one selected from Ti, Mo, and Mn; I' is at least one selected from Cr, V, Fe, scandium (Sc), and yttrium (Y); and J is at least one selected from V, Cr, Mn, Co, Ni, and Cu.

The cathode active material may comprise, for example, at least one selected from compounds represented by Formulae 9 to 11 below:

$$Li_aNi_bCo_cMn_dO_2 \quad \text{Formula 9}$$

wherein, in Formula 9, $0.90 \leq a \leq 1.8$, $0 \leq c \leq 0.5$, and $0 \leq d \leq 0.9$,

$$Li_2MnO_3 \quad \text{Formula 10}$$

$$LiMO_2 \quad \text{Formula 11}$$

wherein, in Formula 11, M is at least one selected from Mn, Fe, Co, and Ni.

The conductive agent may comprise at least one selected from carbon black, natural graphite, artificial graphite, acetylene black, Ketjen black, carbon fibers, carbon nanotubes, metal powder, fibers or tubes of copper, nickel, aluminum, silver, and the like, and conductive polymers such as polyphenylene derivatives, and the like. However, the conductive agent is not limited to the above examples and any suitable conductive agent may be used.

The binder may comprise at least one selected from a vinylidene fluoride/hexafluoropropylene copolymer, polyvinylidenefluoride, polyimide, polyethylene, polyester, polyacrylonitrile, polymethylmethacrylate (PMMA), polytetrafluoroethylene (PTFE), a carboxymethyl cellulose-styrene-butadiene rubber (SMC/SBR) copolymer, and a styrene butadiene rubber-based polymer.

The solvent may comprise at least one selected from N-methylpyrrolidone (NMP), acetone, water, and the like, but is not limited to the above examples. Any suitable solvent may be used.

The amounts of the composite cathode active material, the conductive agent, the binder, and the solvent may be determined by one of skill in the art without undue experimentation. At least one of the conductive agent, the binder, and the solvent may be omitted if desired, for example according to the use and constitution of a lithium battery.

An anode may be manufactured using substantially the same method as that used in the manufacture of the cathode described above, except that an anode active material is used instead of the cathode active material.

The anode active material may comprise at least one selected from a carbonaceous material, silicon, a silicon oxide, a silicon-based alloy, a silicon-carbonaceous material composite, tin, a tin-based alloy, a tin-carbon composite, and a metal oxide.

The carbonaceous material may comprise at least one selected from crystalline carbon and amorphous carbon. The crystalline carbon may comprise graphite such as natural graphite or artificial graphite that is in amorphous, plate, flake, spherical, or fibrous form, and the amorphous carbon may comprise at least one selected from soft carbon (carbon calcined at low temperatures), hard carbon, mesophase pitch carbides, calcined cokes, graphene, carbon black, fullerene soot, carbon nanotubes, carbon fibers, and the like. However, the crystalline and amorphous carbons are not particularly limited to the above examples and any crystalline and amorphous carbons that may be suitable as a carbonaceous material may be used.

The anode active material may comprise at least one selected from Si, $SiO_x$ (where $0<x<2$, for example, $0.5<x<1.5$), Sn, $SnO_2$, and a Si-containing metal alloy. A metal alloyable with Si may be at least one selected from Al, tin (Sn), silver (Ag), Fe, bismuth (Bi), Mg, Zn, indium (In), germanium (Ge), lead (Pb), and Ti.

The anode active material may include a metal/metalloid alloyable with lithium, or an alloy or oxide thereof. For example, the metal/metalloid alloyable with lithium, or the alloy or oxide thereof may comprise at least one selected from Si, Sn, Al, Ge, Pb, Bi, antimony (Sb), a Si—Y' alloy (where Y' is an alkali metal, an alkali earth metal, a Group 13 element, a Group 14 element, a transition metal, and a rare earth element, except for Si), a Sn—Y' alloy (where Y' is at least one selected from an alkali metal, an alkali earth metal, a Group 13 element, a Group 14 element, a transition metal, and a rare earth element, except for Sn), $MnO_x$ (where $0<x\leq2$), and the like. The element Y' in the Sn—Y' alloy may be at least one selected from Mg, calcium (Ca), Sr, barium (Ba), radium (Ra), Sc, Y, Ti, zirconium (Zr), hafnium (Hf), rutherfordium (Rf), V, niobium (Nb), tantalum (Ta), dubnium (Db), Cr, Mo, W, seaborgium (Sg), technetium (Tc), rhenium (Re), bohrium (Bh), Fe, Pb, ruthenium (Ru), osmium (Os), hassium (Hs), rhodium (Rh), iridium (Ir), palladium (Pd), platinum (Pt), Cu, Ag, gold (Au), Zn, cadmium (Cd), B, Al, Ga, Sn, In, germanium (Ge), P, arsenic (As), antimony (Sb), Bi, S, selenium (Se), tellurium (Te), and polonium (Po). For example, the oxide of the metal/metalloid alloyable with lithium may be at least one selected from lithium titanium oxide, vanadium oxide, lithium vanadium oxide, $SnO_2$, $SiO_x$ (where $0<x<2$), and the like.

For example, the anode active material may include at least one element selected from a Group 13 element, a Group 14 element, and a Group 15 element of the periodic table.

For example, the anode active material may include at least one element selected from Si, Ge, and Sn.

The amounts of the anode active material, the conductive agent, the binder, and the solvent may be determined by one of skill in the art without undue experimentation.

A separator is disposed between the cathode and the anode. The separator may be an insulating thin film having high ion permeability and mechanical strength.

The separator generally has a pore diameter of about 0.01 to about 10 μm and a thickness of about 5 to about 20 μm. As the separator, sheets or non-woven fabrics, made of an olefin-based polymer such as polypropylene or the like; or glass fibers or polyethylene are used. When a solid polymer electrolyte is used, the solid polymer electrolyte may also serve as a separator.

The separator made of an olefin-based polymer may be, for example, a single layer of at least one selected from polyethylene, polypropylene, and polyvinylidene fluoride, or may be multiple layers of at least two of these materials, or a mixed multi-layer, such as a polyethylene/polypropylene layer, a polyethylene/polypropylene/polyethylene layer, or a polypropylene/polyethylene/polypropylene layer.

A lithium salt-containing non-aqueous electrolyte may comprise a non-aqueous electrolyte and a lithium salt.

As the non-aqueous electrolyte, at least one selected from a non-aqueous electrolytic solution, an organic solid electrolyte, and an inorganic solid electrolyte may be used.

The non-aqueous electrolytic solution may comprise an organic solvent. Any suitable organic solvent used in the art may be used. For example, the non-aqueous electrolytic solution may comprise at least one selected from propylene carbonate, ethylene carbonate, fluoroethylene carbonate, butylene carbonate, dimethyl carbonate, diethyl carbonate, methyl ethyl carbonate, methyl propyl carbonate, ethyl propyl carbonate, methyl isopropyl carbonate, dipropyl carbonate, dibutyl carbonate, fluoroethylene carbonate, benzonitrile, acetonitrile, tetrahydrofuran, 2-methyl tetrahydrofuran, γ-butyrolactone, dioxolane, 4-methyldioxolane, N,N-dimethylformamide, N,N-dimethylacetamide, dimethylsulfoxide, dioxane, 1,2-dimethoxy ethane, sulfolane, dichloroethane, chlorobenzene, nitrobenzene, diethylene glycol, and dimethyl ether.

Examples of the organic solid electrolyte include at least one selected from a polyethylene derivative, a polyethylene oxide derivative, a polypropylene oxide derivative, a phosphoric acid ester polymer, poly(L-lysine) (poly agitation lysine), polyester sulfide, a polyvinyl alcohol, polyvinylidene fluoride, and a polymer containing ionic dissociation groups.

Non-limiting examples of the inorganic solid electrolyte include at least one selected from $Li_3N$, LiI, $Li_5NI_2$, $Li_3N$—LiI—LiOH, $Li_2SiS_3$, $Li_4SiO_4$, $Li_4SiO_4$—LiI—LiOH, and $Li_3PO_4$—$Li_2S$—$SiS_2$.

The lithium salt is a material that is readily soluble in the non-aqueous electrolyte. Examples thereof include at least one selected from $LiPF_6$, $LiBF_4$, $LiSbF_6$, $LiAsF_6$, $LiClO_4$, $LiCF_3SO_3$, $Li(FSO_2)_2N$, $Li(CF_3SO_2)_2N$, $LiC_4F_9SO_3$, $LiAlO_2$, $LiAlCl_4$, $LiN(C_xF_{2x+1}SO_2)(C_yF_{2y+1}SO_2)$ where x and y are natural numbers, LiCl, LiI, and the like. In addition, in order to enhance charge/discharge characteristics and flame retardancy, an additive may be included, for example, at least one selected from pyridine, triethylphosphite, triethanolamine, cyclic ether, ethylenediamine, n-glyme, hexamethyl phosphoramide, nitrobenzene derivatives, sulfur, quinone imine dyes, N-substituted oxazolidinone, N,N-substituted imidazolidine, ethylene glycol dialkyl ether, ammonium salts, pyrrole, 2-methoxy ethanol, aluminum trichloride, and the like. In some embodiments, in order to impart incombustibility, the electrolyte may further include a halogen-containing solvent such as carbon tetrachloride, ethylene trifluoride, or the like.

Figure 3:
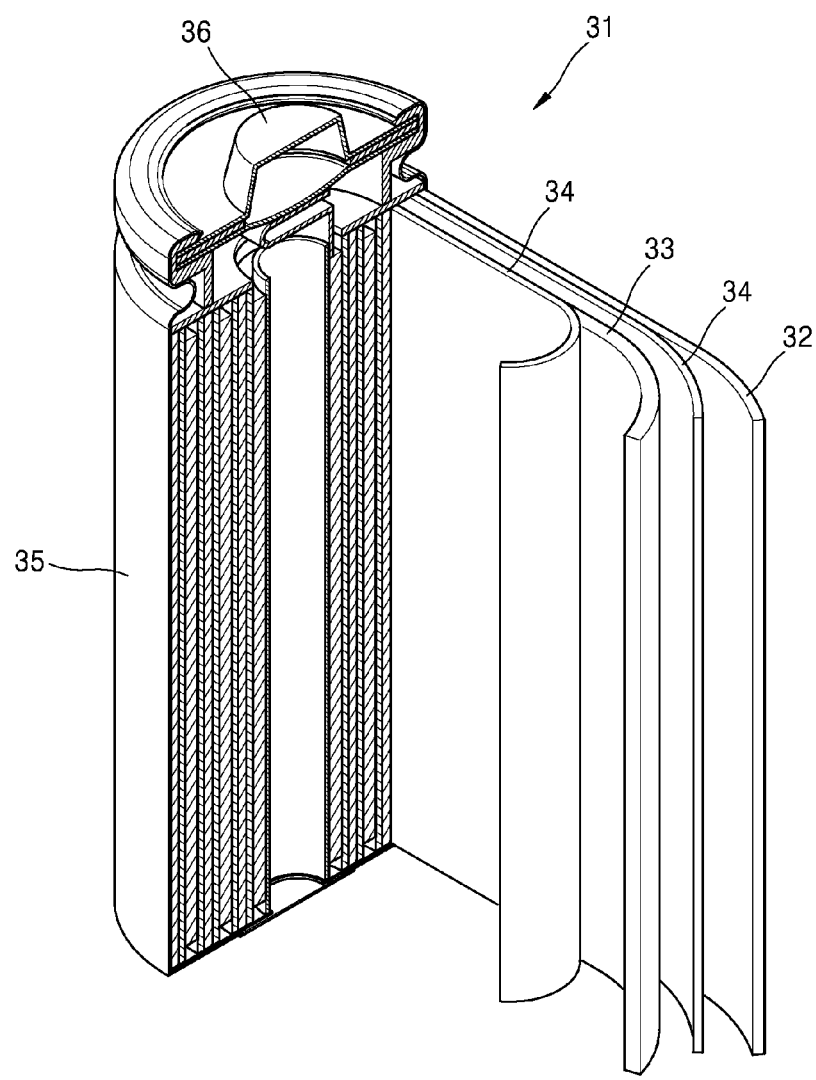
FIG. 3 is an exploded perspective view of a lithium battery according to an embodiment.

As illustrated in FIG. 3, a lithium battery 31 includes a cathode 33, an anode 32, and a separator 34. The cathode 33, the anode 32, and the separator 34 are wound or folded and accommodated in a battery case 35. Subsequently, an organic electrolytic solution is injected into the battery case 35 and the battery case 35 is sealed with a cap assembly 36, thereby completing the manufacture of the lithium battery 31. The battery case 35 may be of a cylindrical type, a rectangular type, a thin film type, or the like. For example, the lithium battery 31 may be a thin film-type battery. The lithium battery 31 may be a lithium ion battery.

A separator may be disposed between the cathode and the anode to form a battery assembly. Battery assemblies may be stacked in a bi-cell structure, and then impregnated with an organic electrolytic solution, and the obtained resultant is housed in a pouch and sealed, thereby completing the manufacture of a lithium ion polymer battery.

In addition, a plurality of battery assemblies may be stacked upon one another to form a battery pack, and the battery pack may be used in a high-capacity and high-output device. For example, the battery pack may be used in a notebook computer, smart phone, electric vehicle, and the like.

The composite cathode active material has a reduction-oxidation (redox) reaction peak existing in the spinel structure within a voltage range of about 2 V to about 3 V vs Li metal during charging and discharging of the battery, as measured using a graph of a voltage (V vs lithium metal, horizontal axis) versus differential capacity (dQ/dV, vertical axis) obtained by differentiating a charging and discharging capacity of a half-cell including a cathode including the composite cathode active material disclosed herein and lithium metal as a counter electrode.

The lithium battery has a capacity retention rate of about 92% or more, or about 93% or more, or about 94% or more, after 50 charge/discharge cycles are repeated, and thus has excellent lifespan characteristics.

The lithium battery has excellent high-rate characteristics and lifespan characteristics and thus is suitable for use in electric vehicles (EVs). For example, the lithium battery is suitable for use in hybrid vehicles such as plug-in hybrid EVs (PHEVs).

An embodiment will now be described in further detail with reference to the following examples and comparative examples. However, these examples are provided for illustrative purposes only and are not intended to limit the scope of the embodiments.

EXAMPLES

Comparative Example 1: Preparation of Cathode Active Material

Nickel sulfate, cobalt sulfate, and manganese sulfate as starting materials were mixed in stoichiometric amounts to obtain a cathode active material ($Li_{1.015}Ni_{0.8}Co_{0.15}Mn_{0.05}O_2$).

Nickel sulfate, cobalt sulfate, and manganese sulfate in a molar ratio of 85:15:5 were dissolved in distilled water to obtain a 2 molar (M) precursor mixture. Then, $NH_4OH$ as a chelating agent and NaOH as a precipitant were added to the precursor mixture and the resulting mixture was co-precipitated at 60° C. for 4 hours to obtain a precipitate (($Ni_{0.8}Co_{0.15}Mn_{0.05}$)(OH)$_2$).

The precipitate (($Ni_{0.8}Co_{0.15}Mn_{0.05}$)(OH)$_2$) was washed with distilled water, dried at 80° C. for 24 hours, mixed with lithium carbonate, and then ground. In this regard, lithium carbonate was added in a stoichiometric amount to obtain a cathode active material ($Li_{1.015}Ni_{0.8}Co_{0.15}Mn_{0.05}O_2$).

The ground mixture was heat-treated at 750° C. for 10 hours in an oxygen gas atmosphere to obtain a cathode active material ($Li_{1.015}Ni_{0.8}Co_{0.15}Mn_{0.05}O_2$ ("NCM")).

Example 1: Preparation of Composite Cathode Active Material

First, 1 gram (g) of nitric acid was dissolved in 9 g of deionized water to prepare an aqueous nitric acid solution.

1 g of zirconium (IV) oxynitrate hydrate ($ZrO(NO_3)_2 \cdot 4H_2O$) was dissolved in the aqueous nitric acid solution to obtain a zirconium oxynitrate solution. The zirconium oxynitrate solution had a pH of about 1.

Separately, 0.15 g of diammonium phosphate (($NH_4)_2HPO_4$) was dissolved in 3 g of deionized water to obtain a diammonium phosphate solution. 30 g of the cathode active material (NCM) prepared according to Comparative Example 1 was immersed in the zirconium oxynitrate solution and the diammonium phosphate solution was added dropwise thereto. The resulting mixture was stirred at about 80° C. for 5 minutes. After the stirring process, the resulting solution was dried at 120° C. for 10 hours. A product obtained after the drying process was heat-treated at 720° C. for 5 hours in an oxygen gas atmosphere to obtain a composite cathode active material including lithium composite oxide, and a coating layer disposed on at least a portion of the lithium composite oxide, and including a Zr and P-containing composite including $ZrP_2O_7$ and $LiZr_2(PO_4)_3$. A molar ratio of Zr to P in the coating layer was 5:5, and a total amount of the composite was about 1 weight percent (wt %) based on the total weight of the cathode active material with the coating layer disposed thereon.

Examples 2 to 5: Preparation of Composite Cathode Active Material

Composite cathode active materials were prepared in the same manner as described in Example 1, except that the molar ratio of Zr to P in the coating layer was changed to 2:8, 4:6, 6:4, and 8:2, respectively.

Examples 6 and 7: Preparation of Composite Cathode Active Material

Composite cathode active materials were prepared in the same manner as described in Example 1, except that the molar ratio of Zr to P in the coating layer was 5:5, and the total amounts of the composites were about 0.5 wt % and about 2 wt %, respectively, based on the total weight of the cathode active material with the coating layer disposed thereon.

Comparative Example 2: Preparation of Composite Cathode Active Material 1 g of zirconium oxynitrate ($ZrO(NO_3)_2 \cdot 4H_2O$) was added to 9 g of deionized water to obtain a zirconium oxynitrate mixture. 30 g of the cathode active material (NCM) of Comparative Example 1 was immersed in the zirconium oxynitrate mixture. The resulting mixture was stirred at 80° C. for 5 minutes. The resulting solution was stirred and then dried at 120° C. to completely evaporate the solution. A product obtained after evaporation was heat-treated at 720° C. for 5 hours in an oxygen gas atmosphere to obtain a composite cathode active material having a coating layer including $ZrO_2$ and $Li_2ZrO_3$. A total amount of a composite in the coating layer was about 1 wt % based on a total weight of the cathode active material with the coating layer disposed thereon.

Comparative Example 3: Preparation of Composite Cathode Active Material 0.15 g of diammonium phosphate (($NH_4)_2HPO_4$) was dissolved in 3 g of deionized water to obtain a diammonium phosphate solution.

The diammonium phosphate solution was added dropwise to 30 g of the cathode active material (NCM) of Comparative Example 1. The resulting mixture was stirred at 80° C. for 5 minutes. The resultant mixture was stirred and dried at 120° C. for 10 hours to completely evaporate the solution. The resulting coated NCM was heat-treated at 720° C. for 5 hours in an oxygen gas atmosphere to obtain a composite cathode active material having a coating layer including $Li_3PO_4$ and $LiPO_4$. A total amount of a coating layer material in the coating layer was about 1 wt % based on a total weight of the cathode active material with the coating layer disposed thereon.

Comparative Example 4: Preparation of Composite Cathode Active Material 9 g of deionized water was added to 1 g of zirconium oxynitrate ($ZrO(NO_3)_2 \cdot 4H_2O$) to obtain a zirconium oxynitrate mixture. In this regard, zirconium oxynitrate floated on a surface of the deionized water due to the insolubility thereof in deionized water.

Separately, 3 g of deionized water was added to 0.15 g of diammonium phosphate (($NH_4)_2HPO_4$) to obtain a diammonium phosphate mixture.

Subsequently, 30 g of the cathode active material (NCM) of Comparative Example 1 was immersed in the zirconium oxynitrate mixture and then the diammonium phosphate mixture was added thereto. The resulting mixture was stirred at 80° C. for 5 minutes.

The resultant was dried at 120° C. for 10 hours to completely evaporate the solution. The resulting coated NCM was heat-treated at 720° C. for 5 hours in an oxygen gas atmosphere to obtain a composite cathode active material. A total amount of a coating layer material in the coating layer was about 1 wt %, based on a total weight of the cathode active material with the coating layer disposed thereon.

Reference Examples 1 to 3 below are simulated experiments to confirm the composition of the coating layer of each of the composite cathode active materials of Examples 1 to 7 and the simulated experiments were conducted using zirconium oxynitrate hydroxide, diammonium phosphate (($NH_4)_2HPO_4$), and residual lithium (LiOH, $Li_2CO_3$). The simulated experiments were conducted assuming that the coating materials, except for the residual lithium and NCM, participate in a reaction during the coating process. In these experiments, zirconium oxynitrate hydroxide and diammonium phosphate were used in the same amount and the amount of the lithium source ($Li_2CO_3$, LiOH) was one half (½) of the desired amount. In this regard, the use of the lithium source in an amount of only ½ the desired amount was determined in consideration of the lack of participation of the residual lithium in the reaction.

Reference Example 1

First, 1 g of nitric acid was dissolved in 9 g of deionized water to prepare an aqueous nitric acid solution.

1 g of zirconium (IV) oxynitrate hydrate ($ZrO(NO_3)_2 \cdot 4H_2O$) was dissolved in the aqueous nitric acid solution to obtain a zirconium oxynitrate solution. The zirconium oxynitrate solution had a pH of about 1.

Separately, 0.15 g of diammonium phosphate (($NH_4)_2HPO_4$) was dissolved in 3 g of deionized water to obtain a diammonium phosphate solution.

The zirconium oxynitrate solution and the diammonium phosphate solution were added dropwise to 0.15 g of lithium hydroxide (LiOH). The resulting mixture was stirred at 80° C. for 5 minutes. The resulting solution was stirred and then dried at 120° C. for 10 hours. The resultant was heat-treated at 720° C. for 5 hours in an oxygen gas atmosphere to prepare a Zr and P-containing composite. A molar ratio of Zr to P in the composite was 5:5.

Reference Example 2

0.15 g of diammonium phosphate (($NH_4)_2HPO_4$) was dissolved in 3 g of deionized water to obtain a diammonium phosphate solution.

The diammonium phosphate solution was added dropwise to 0.15 g of lithium hydroxide (LiOH). The resulting mixture was stirred at 80° C. for 5 minutes. The resulting solution was stirred and then dried at 120° C. for 10 hours. The resultant was heat-treated at 720° C. for 5 hours in an oxygen gas atmosphere to obtain a P-containing composite.

Reference Example 3

1 g of zirconium oxynitrate ($ZrO(NO_3)_2 \cdot 4H_2O$) was dissolved in 9 g of deionized water to obtain a zirconium oxynitrate solution.

The zirconium oxynitrate solution was mixed with 0.15 g of lithium hydroxide (LiOH). The resulting mixture was stirred at 80° C. for 5 minutes. The resulting solution was stirred and then dried at 120° C. for 10 hours. The resultant was heat-treated at 720° C. for 5 hours in an oxygen gas atmosphere to obtain a Zr-containing composite.

Example 8: Manufacture of Lithium Battery (Coin Cell)

The cathode active material of Example 1, Denka black (carbon black), and polyvinylidene fluoride (PVDF) were uniformly mixed in N-methyl-2-pyrrolidone (NMP) in a weight ratio of 90:5:5 to prepare a slurry. The slurry was coated, using a doctor blade on Al foil having a thickness of 15 μm and then the coated Al foil was dried at 120° C. under reduced pressure and pressed using a roll press to manufacture a sheet-type cathode.

A porous polyethylene separator was disposed between the cathode and lithium metal as an anode, and an electrolyte was injected thereinto to manufacture a coin cell. In this regard, the electrolyte was a solution of 1.0 M $LiPF_6$ dissolved in a solution of fluoroethylene carbonate (FEC) and dimethyl carbonate (DMC) in a volume ratio of 4:6.

Examples 9 to 14: Manufacture of Lithium Batteries (Coin Cells)

Coin cells were manufactured in the same manner as described in Example 8, except that the composite cathode active materials of Examples 2 to 7 were respectively used instead of the composite cathode active material of Example 1.

Comparative Examples 5 to 8: Manufacture of Lithium Batteries (Coin Cells)

Coin cells were manufactured in the same manner as described in Example 8, except that the composite cathode active materials of Comparative Examples 1 to 4, respectively were used instead of the composite cathode active material of Example 1.

Comparative Example 9

0.15 g of $AlPO_4$ was dissolved in 3 g of deionized water to obtain an aluminum phosphate solution.

The aluminum phosphate solution was added dropwise to 0.15 g of lithium hydroxide (LiOH). The resulting mixture was stirred at 80° C. for 5 minutes. The resulting solution was stirred and dried at 120° C. for 10 hours to completely evaporate the solution. The resultant obtained after evaporation was heat-treated at 720° C. for 5 hours in an oxygen gas atmosphere to obtain a composite cathode active material having a coating layer containing Al and P. A molar ratio of Al to P in the coating layer was 5:5, and a total amount of materials forming the coating layer containing Al and P was 1 wt %.

Comparative Example 10

A composite cathode active material having a coating layer containing Co and P was prepared in the same manner as described in Comparative Example 9, except that $CoPO_4$ was used instead of $AlPO_4$. A molar ratio of materials for forming the coating layer containing Co and P was 5:5.

Comparative Example 11

A composite cathode active material having a coating layer containing Fe and P was prepared in the same manner as described in Comparative Example 9, except that $FePO_4$ was used instead of $AlPO_4$. A molar ratio of Fe to P in the coating layer was 5:5, and a total amount of materials for forming the coating layer containing Fe and P was 1 wt %.

Comparative Examples 12 to 14: Manufacture of Lithium Batteries (Coin Cells)

Coin cells were manufactured in the same manner as in Example 8, except that the composite cathode active material prepared according to Comparative Examples 9 to 11 were respectively used instead of the composite cathode active material of Example 1.

Comparative Example 15

9 g of deionized water was added to 1 g of zirconium oxynitrate ($ZrO(NO_3)_2 \cdot 4H_2O$) to obtain a zirconium oxynitrate mixture. In the zirconium oxynitrate mixture, zirconium oxynitrate floated on a surface of the deionized water due to insolubility thereof in deionized water. Separately, 3 g of deionized water was added to 0.15 g of diammonium phosphate (($NH_4)_2HPO_4$) to obtain a diammonium phosphate mixture.

30 g of the cathode active material (NCM) of Comparative Example 1 was immersed in the zirconium oxynitrate mixture and then the diammonium phosphate mixture was added thereto. The resulting mixture was stirred at 80° C. for 5 minutes.

The mixture was filtered and the obtained filtrate was dried at 120° C. for 10 hours to completely evaporate the solution. The resulting coated NCM was heat-treated at 720° C. for 5 hours in an oxygen gas atmosphere.

Comparative Example 16: Preparation of Composite Cathode Active Material

A composite cathode active material was prepared in the same manner as in Example 1, except that a second heat treatment process was performed at 600° C.

As a result of this experiment, it was difficult to obtain a composite cathode active material having a desired composition. From the result, it was confirmed that the second heat treatment temperature has a direct impact on the preparation of a composite cathode active material having a desired composition.

Evaluation Example 1: X-Ray Diffraction (XRD) Analysis

1) Example 1 and Comparative Examples 1 to 3

XRD analysis using CuKα was performed on the cathode active materials of Example 1 and Comparative Examples 1 to 3. The XRD analysis was performed using a Rigaku RINT2200HF+ diffractometer using CuKα radiation (1.540598 Å).

Figure 4A:
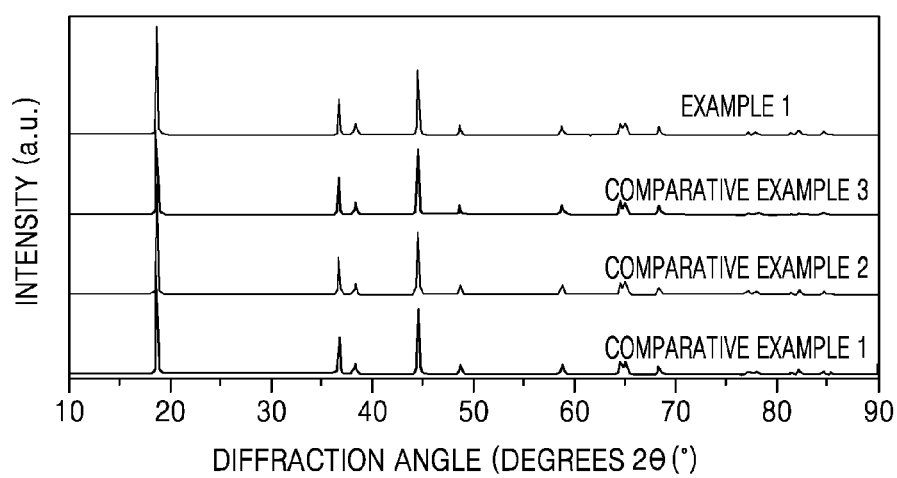
FIG. 4A is a graph of intensity (arbitrary units, a.u.) versus diffraction angle (degrees 2-theta, 2Θ) showing X-ray diffraction (XRD) analysis results of a composite cathode active material prepared according to Example 1 and the cathode active materials prepared according to Comparative Examples 1 to 3, in which the X-ray diffraction analysis was conducted using CuKα.

The XRD analysis results of the composite cathode active materials of Example 1 and Comparative Examples 1 to 3 are shown in FIG. 4A.

Referring to FIG. 4A, it is confirmed that the composite cathode active material of Example 1 showed no significant structural change, as compared to the cathode active materials of Comparative Examples 1 to 3. In addition, it is confirmed that residual carbon existed in the cathode active material of Comparative Example 2.

2) Reference Examples 1 to 3

Figure 6A:
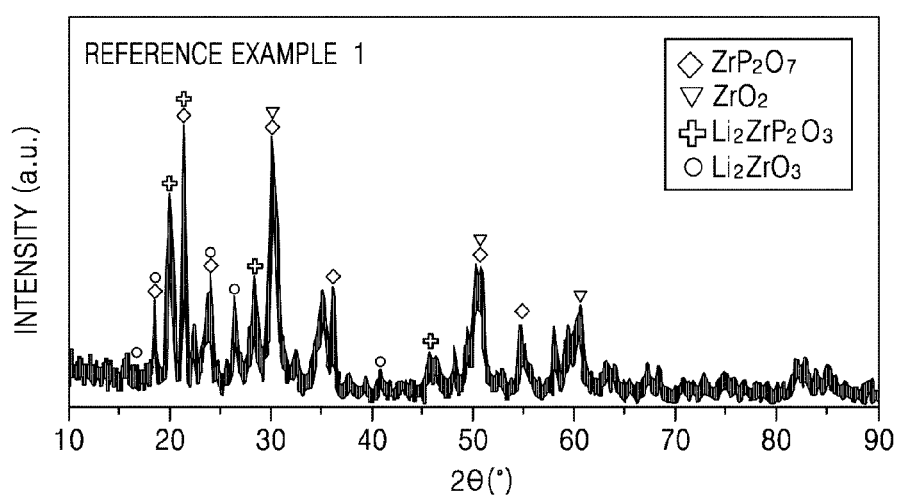
FIGS. 6A to 6C are graphs of intensity (a.u.) versus diffraction angle (degrees 2Θ) showing XRD analysis results of materials prepared according to Reference Examples 1, 2 and 3, respectively.
Figure 6B:
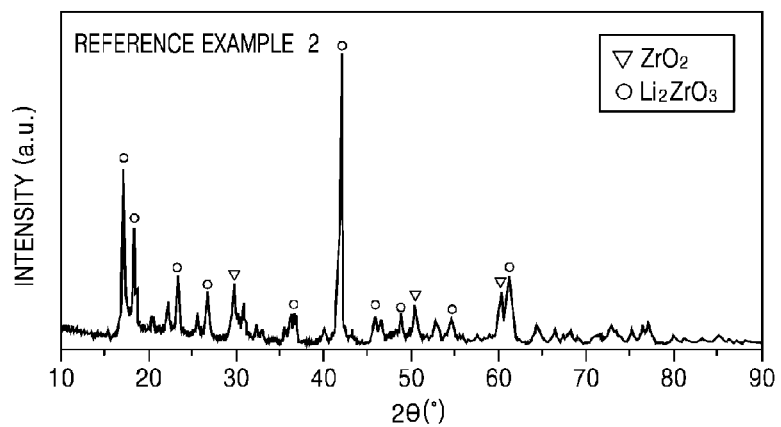
Figure 6C:
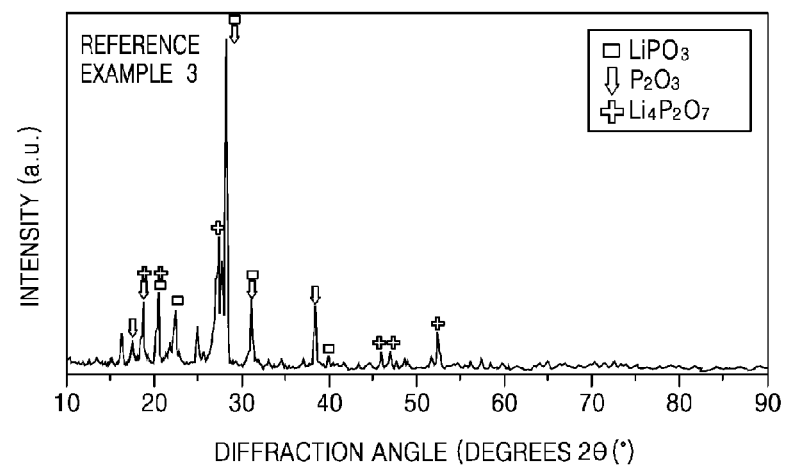

XRD analysis was performed on the materials prepared according to Reference Examples 1 to 3, and the results are shown in FIGS. 6A to 6C.

Reference Example 1 is a simulated experiment performed in the same manner as in Example 1, except that NCM was not used and lithium hydroxide as a lithium precursor was used instead of the residual lithium of NCM. The XRD analysis results of the cathode active material of Reference Example 1 may be regarded to be substantially the same as those of the composite cathode active material of Example 1.

Unlike the cases of Reference Examples 2 and 3 (FIGS. 6B and 6C), a composite phase of Zr and P was observed in the case of Reference Example 1 (FIG. 6A). As illustrated in FIG. 6A, the composite phase of Zr and P included $ZrO_2$, $Li_2ZrO_3$, $ZrP_2O_7$, and $Li_2Zr_2(PO_4)_3$. In addition, it is confirmed that the material of Reference Example 1 had exactly the same phase as that of the composite cathode active material of Example 1 (FIG. 4A).

In FIG. 6A, peak A appears at a diffraction angle degrees 2θ of about 18° to about 19°, which corresponds to $ZrP_2O_7$. In addition, peak B appears at diffraction angle degrees 2θ of about 19.5° to about 20.5°, which corresponds to $Li_2Zr_2(PO_4)_3$. As illustrated in FIG. 6A, the peak A had a weaker intensity than that of the peak B, and an intensity ratio of A to B was about 0.5:1.

Evaluation Example 2: X-Ray Photoelectron Spectroscopy (XPS)

1) Example 1 and Comparative Examples 1 to 3

XPS analysis was performed on the composite cathode active material of Example 1 and the cathode active materials of Comparative Examples 1 to 3 by using Quantum 2000 (manufactured by Physical Electronics) equipment (ϕ Physical Electronics Quantum 2000 Scanning ESCA Microprobe spectrometer with focused monochromatized Al Kα radiation at 1486.6 eV).

Figure 4B:
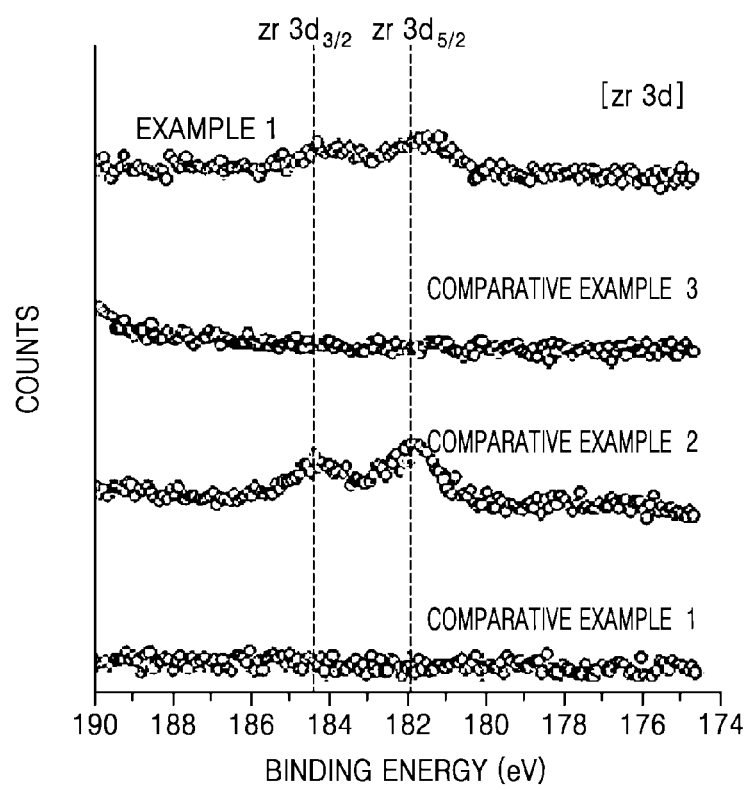
FIGS. 4B and 4C are graphs of counts versus binding energy (electron volts, eV) showing the results of X-ray photoelectron spectroscopy (XPS) analysis of the composite cathode active material of Example 1 and the cathode active materials of Comparative Examples 1 to 3.
Figure 4C:
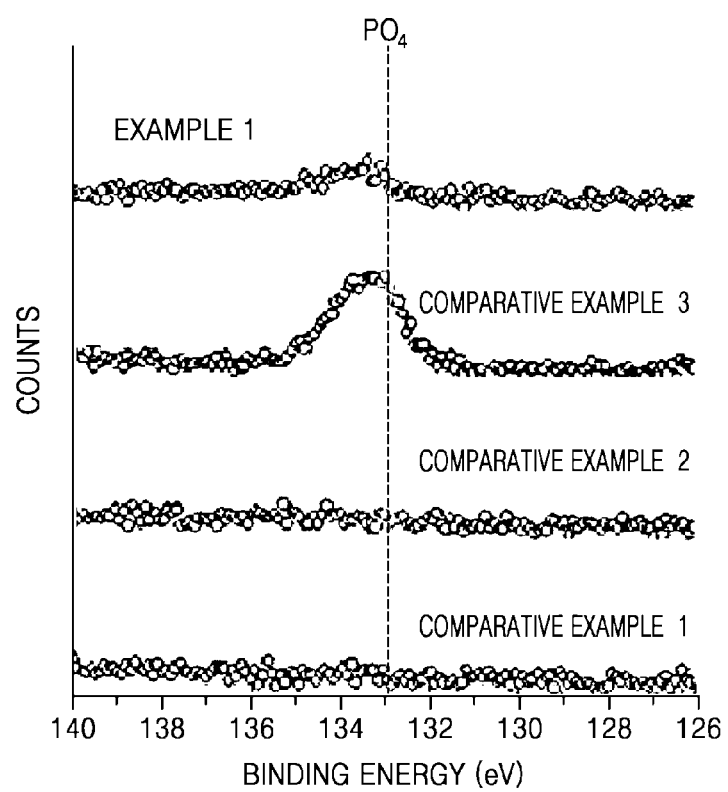

The XPS analysis results are shown in FIGS. 4B and 4C.

Referring to the drawings, it is confirmed that the coating layer of the composite cathode active material of Example 1 included $Zr^{4+}$ and $P^{5+}$.

Referring to FIG. 4B, a peak having a strong intensity appears at a binding energy of 181.8 eV, which corresponds to Zr $3d_{5/2}$, and a peak having a small shoulder peak intensity around 184.2 eV corresponds to Zr $3d_{3/2}$, and thus the presence of $Zr^{4+}$ was confirmed. The $Zr^{4+}$ peak may be obtained from $ZrO_2$, $Li_2ZrO_3$, $Zr_2P_2O_9$, $ZrP_2O_7$, and $LiZr_2(PO_4)_3$.

Referring to FIG. 4C, the presence of $P^{5+}$ is confirmed from the P 2p (133.5 eV) peak. Without being limited by theory, it is believed that this peak may be obtained from $Li_3PO_4$, and $Li_3PO_4$ and may be formed by a reaction between residual lithium and P or $P_2O_5$.

Evaluation Example 3: Scanning Electron Microscopy (SEM)

SEM analysis was performed on the composite cathode active materials of Example 1, Comparative Examples 1 to 3, and Reference Example 3. S-4700N (manufactured by Hitachi) was used as an SEM analyzer. An SEM image of the composite cathode active material of Example 1 is shown in FIG. 5A.

Figure 5A:
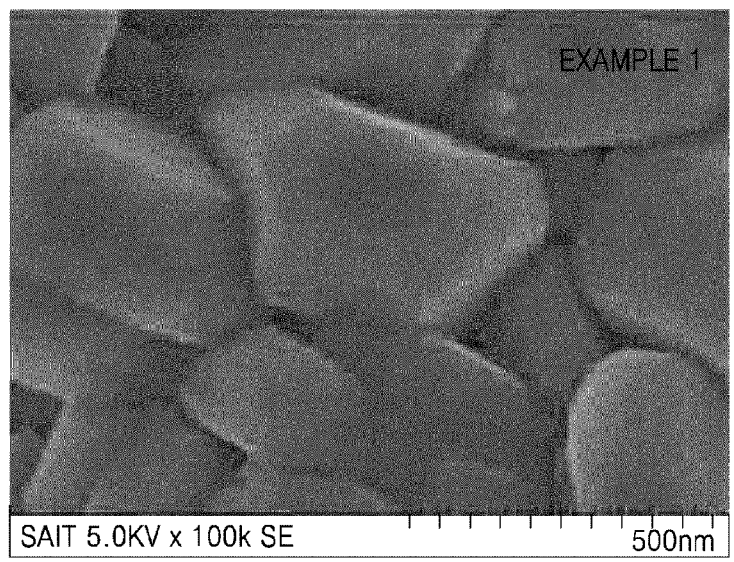
FIG. 5A is a scanning electron microscope (SEM) image of the composite cathode active material of Example 1.

Referring to FIG. 5A, it is qualitatively confirmed that Zr and P were uniformly coated on a surface of the composite cathode active material of Example 1.

Figure 5B:
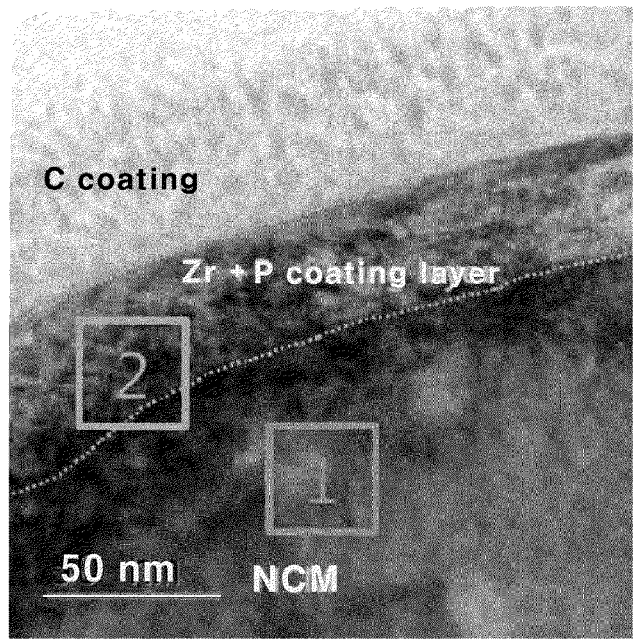
FIG. 5B is a high-resolution scanning TEM (HRSTEM) image of the composite cathode active material of Example 1.
Figure 5C:
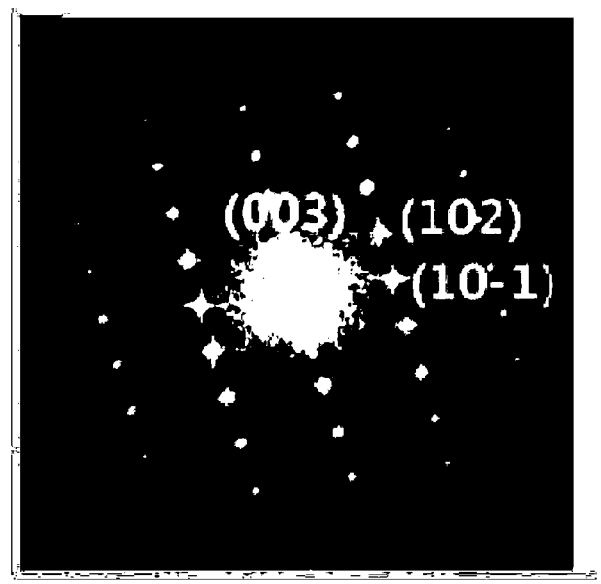
FIG. 5C is a further magnified HRSTEM image of the selected area electron diffraction (SAED) pattern of area 1 in FIG. 5B.
Figure 5D:
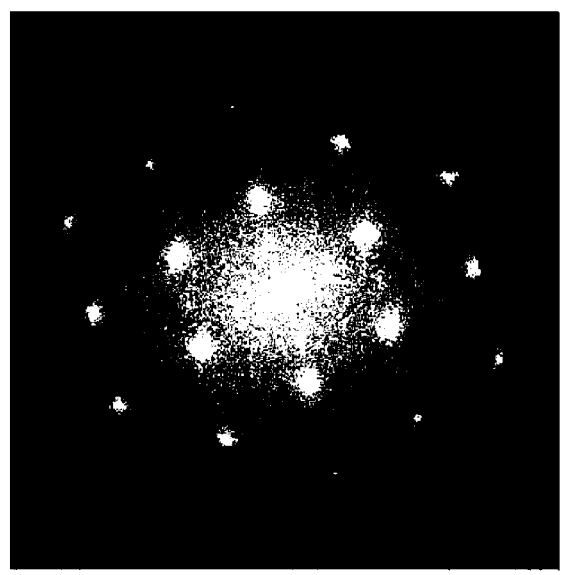
FIG. 5D is a further magnified HRSTEM image of the SAED pattern of area 2 in FIG. 5B.
Figure 5E:
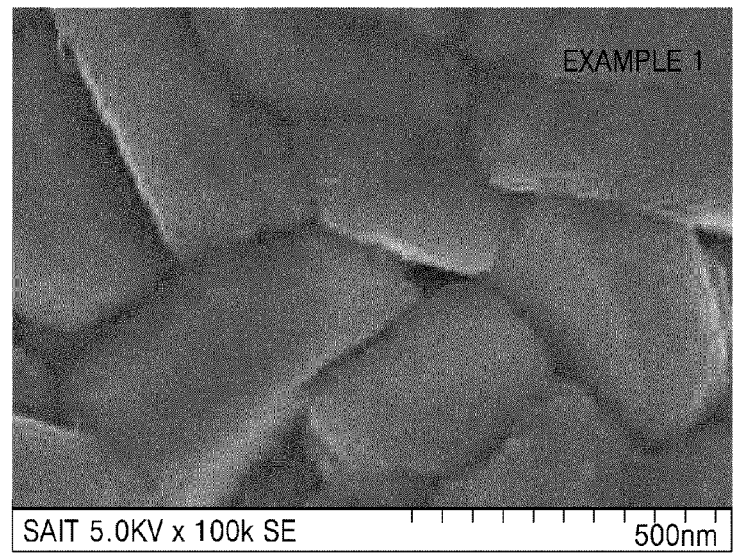
FIG. 5E is an SEM image of the cathode active material of Comparative Example 1.

An SEM image of the cathode active material of Comparative Example 1 is shown in FIG. 5E.

Referring to FIG. 5E, it is confirmed that, unlike the case of Example 1, a material appearing as residual lithium, i.e., lithium hydroxide and lithium carbonate, was observed on a surface of the cathode active material of Comparative Example 1, and the cathode active material of Comparative Example 1 had no coating layer.

By contrast, the composite cathode active material of Example 1 had a relatively clear surface as compared to the case of Comparative Example 1, due to the formation of the coating layer as described above and conversion of the residual lithium into other materials such as $Li_2ZrO_3$ or $Li_3PO_4$ during the coating. The conversion of the residual lithium into coating materials was confirmed from DFT calculation results.

Figure 5F:
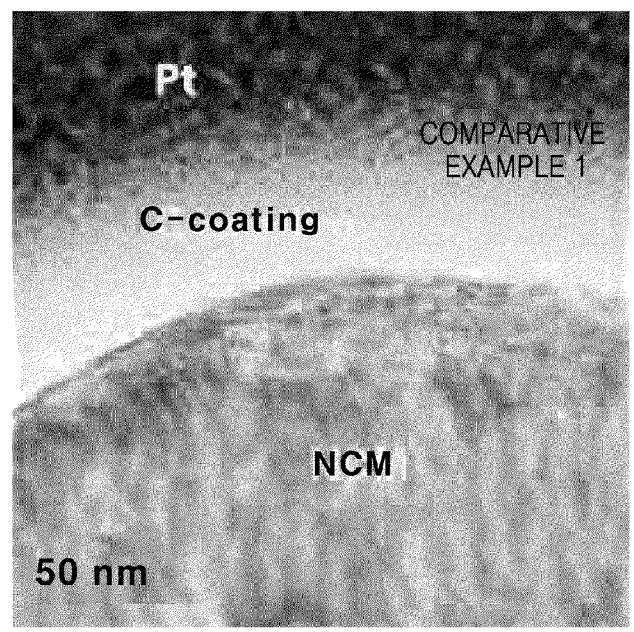
FIG. 5F is a HRSTEM image showing the cathode active material of Comparative Example 1.
Figure 5G:
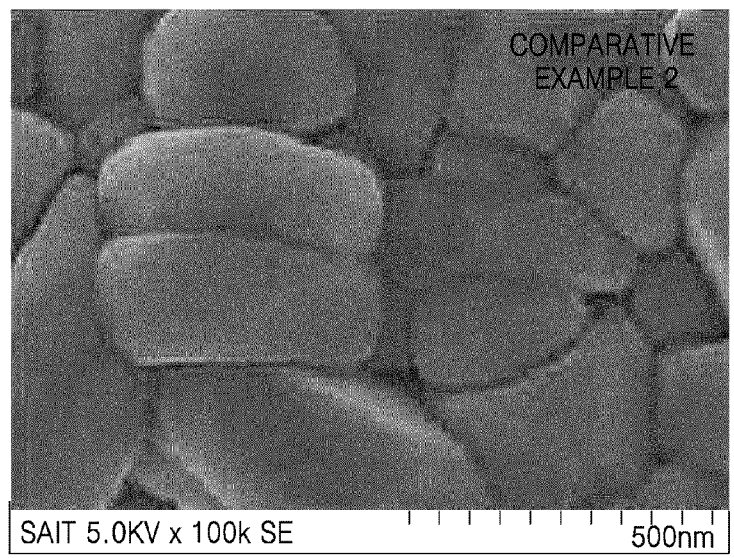
FIGS. 5G and 5H are SEM images of the cathode active materials of Comparative Examples 2 and 3, respectively.
Figure 5H:
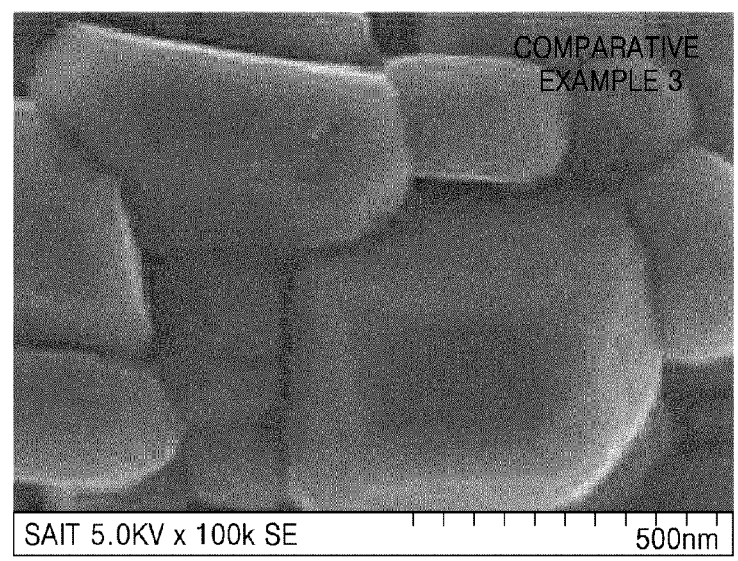
Figure 5I:
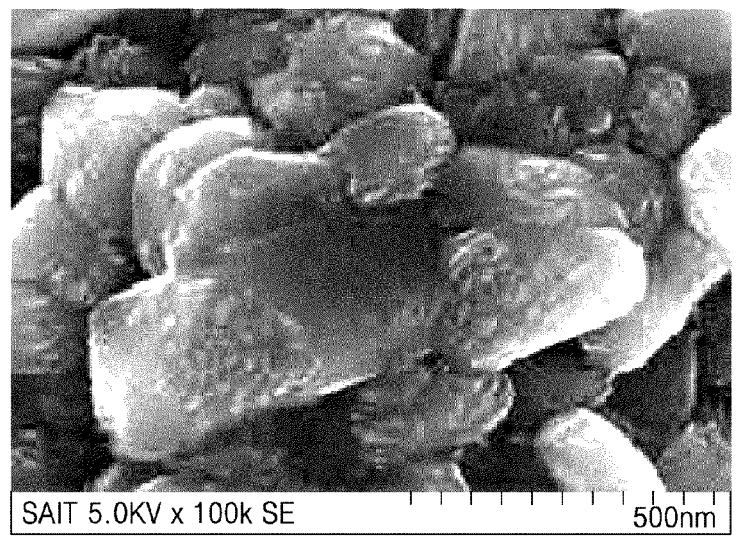
FIG. 5I is an SEM image of a cathode active material prepared according to Reference Example 3.

In addition, SEM images of the cathode active materials of Comparative Examples 2 and 3 are shown in FIGS. 5G and 5H. Referring to the drawings, it is confirmed that the cathode active materials of Comparative Examples 2 and 3 had island-type coating layers.

Evaluation Example 4: Transmission Electron Microscopy (TEM)

High-resolution scanning TEM (HRSTEM) analysis was performed on the composite cathode active materials of Example 1, Comparative Examples 1 to 3, and Reference Example 3. TEM images were obtained using an FEI Titan Cubed 60-300 microscope equipped with Cs correctors and a monochromator (@acceleration voltage: 300 V).

HRSTEM images of the composite cathode active material of Example 1 are shown in FIGS. 5B to 5D. FIG. 5C illustrates a selected area electron diffraction (SAED) pattern of area 1 of FIG. 5B, and FIG. 5D illustrates an SAED pattern of area 2 of FIG. 5B.

The SAED pattern of area 1 shows a layered structure and satellite spots having different phases by coating materials.

From the above result, it is confirmed that Zr and P were uniformly coated on a surface of the composite cathode active material of Example 1.

The composite cathode active material of Example 1 shows different aspects from a case of coating with other metal phosphate materials such as $LiCoPO_4$ and $LiAlPO_4$. The other metal phosphate materials such as $LiCoPO_4$ and $LiAlPO_4$ are coated on a surface of NCM powder, which has been mostly formed through a wet process including co-precipitation, drying and heat-treating. However, the Zr and P-containing composite of Example 1 was formed during the heat treatment process, not during a wet process. The coating layer including the Zr and P-containing composite is uniform, while the other metal phosphate materials such as $LiCoPO_4$ and $LiAlPO_4$ show an island type formation.

A HRSTEM image of the cathode active material of Comparative Example 1 is shown in FIG. 5F. Referring to FIG. 5F, unlike the case of Example 1, a material appearing as residual lithium was observed on a surface of the cathode active material of Comparative Example 1 and no coating layer was disposed thereon. By contrast, the composite cathode active material of Example 1 had a coating layer as described above and thus residual lithium was barely observed.

Evaluation Example 5: Density Functional Theory (DFT) Calculation

Computer calculation using the DFT was performed on the materials of Reference Examples 1 to 3 to understand a reaction mechanism of materials for forming a coating layer of a composite cathode active material. Structure files are obtained from Materials Project, and this structure is available in the Inorganic Crystal Structure Database (ICSD). The Heyd-Scuseria-Ernzerhof (HSE06) hybrid function was used to calculate the energy of a system without geometric optimization. A plane-wave cutoff was controlled to be about 500 eV, and configurations used in Materials Project were applied for k-point generation. The DFT calculation results are shown in FIG. 7.

Figure 7:
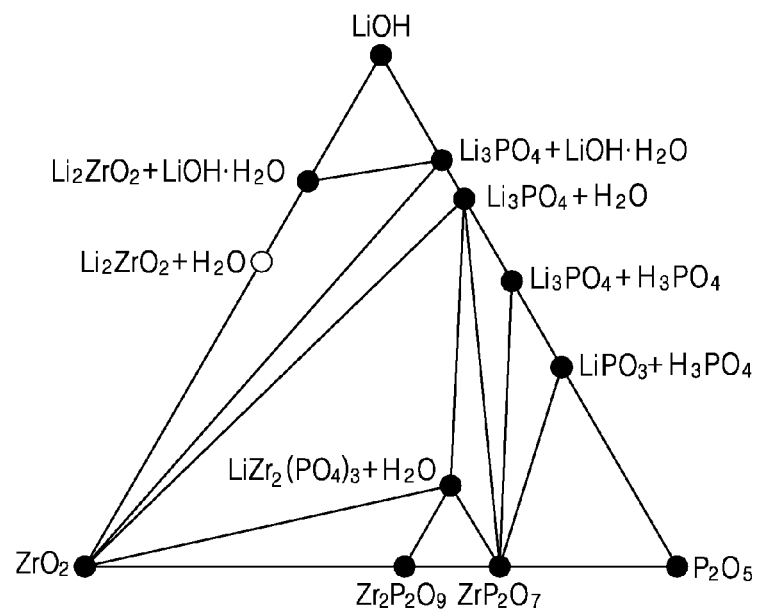
FIG. 7 is a phase diagram illustrating density functional theory (DFT) calculation results of the materials of Reference Examples 1 to 3.

Referring to FIG. 7, it is confirmed that phases obtained as a result of DFT calculation were the same as those observed of the materials of Reference Examples 1 to 3.

In further detail with reference to FIG. 7, zirconium oxynitrate hydrate thermally decomposes at 500° C. A main coating material is $ZrO_2$. In addition, diammonium phosphate ($(NH_4)_2HPO_4$) may be heat-treated at 400° C. to form $P_2O_5$. In addition, $(NR_4)_2HPO_4$ includes about 40% or more of $P_2O_5$. Thus, in a calcination process, materials reactive with residual lithium hydroxide were $ZrO_2$ and $P_2O_5$. FIG. 7 is a phase diagram of $ZrO_2$—$P_2O_5$—LiOH (ZPL). Referring to FIG. 7, it is confirmed that various stable phases are energetically desirable and coating materials may exist as a mixture.

$ZrO_2$ reacts with residual LiOH to prepare a $Li_2ZrO_3$ phase as illustrated in Reaction Scheme 1.

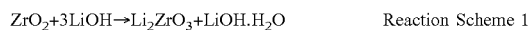

$ZrO_2 + 3LiOH \rightarrow Li_2ZrO_3 + LiOH \cdot H_2O$  Reaction Scheme 1

In this case, however, a residual lithium source (LiOH—$H_2O$) is present. A reaction energy approximates equilibrium of reactants and reaction products. In addition, $Li_2ZrO_3$ dissociates into $ZrO_2$ and LiOH in the presence of water due to a low reaction energy of –0.004 Ev, as illustrated in Reaction Scheme 2.

$Li_2ZrO_3 + H_2O \rightarrow ZrO_2 + 2LiOH$  Reaction Scheme 2

All reactants approximate an equilibrium state and thus $ZrO_2$, LiOH, and $Li_2ZrO_3$ may be simultaneously present during the heat treatment. In this regard, $ZrO_2$ barely reacts with $Li_2CO_3$. Thus, Zr-coating has a low effect on removal of lithium residues. As a result of a reaction between $ZrO_2$ and $P_2O_5$, $Zr_2P_2O_9$ and $ZrP_2O_7$ phases are formed. The two phases may be confirmed by the XRD results.

Various reactions between $P_2O_5$ and LiOH may occur to form $LiPO_3$, $Li_3PO_4$, and $H_3PO_4$. From the XRD results, it is confirmed that even a small amount of $LiPO_3$ may be maintained as a coating layer material. $Li_3PO_4$ may be formed from a reaction between $(NH_4)_2HPO_4$ and LiOH. $P_2O_5$ is already present in $(NH_4)_2HPO_4$ and thus it is confirmed that $Li_3PO_4$ was present on the surface of the coating layer. Finally, from the recent XRD analysis, it is confirmed that $LiZr_2(PO_4)_3$ was formed as a coating material, which is the same as the simulated experiment results described above.

Evaluation Example 6: Charge and Discharge Characteristics (Initial Capacity and Capacity Retention Rate)

1) Example 8 and Comparative Examples 5 to 8

Each of the coin cells manufactured according to Example 8 and Comparative Examples 5 to 8 was charged at a constant current (CC) of 0.1 C up to 4.4 V and then discharged at a constant current of 0.1 C up to 2.8 V.

From the $2^{nd}$ cycle of charging and discharging, each coin cell was charged at a constant current (CC) of 0.5 C and a constant voltage (CV) of 4.4 V, followed by charging up to a current of 0.05 C, and then discharged at 1 C up to 2.8 V. Cycle characteristics were evaluated after the following 50 cycles of charging and discharging: charging at a CC of 1 C up to 4.4 V and discharging at 1 C up to 2.8 V. The cycle of charging and discharging described above was repeated 50 times.

An initial charge-discharge efficiency is calculated by Equation 1 below, and a capacity retention rate is represented by Equation 1 below:

Initial charge-discharge efficiency={(discharge capacity at $1^{st}$ cycle)/(charge capacity at $1^{st}$ cycle)}× 100%  Equation 1

Capacity retention rate[%]=[discharge capacity at $50^{th}$ cycle/discharge capacity at $1^{st}$ cycle]×100%  Equation 2

Figure 8A:
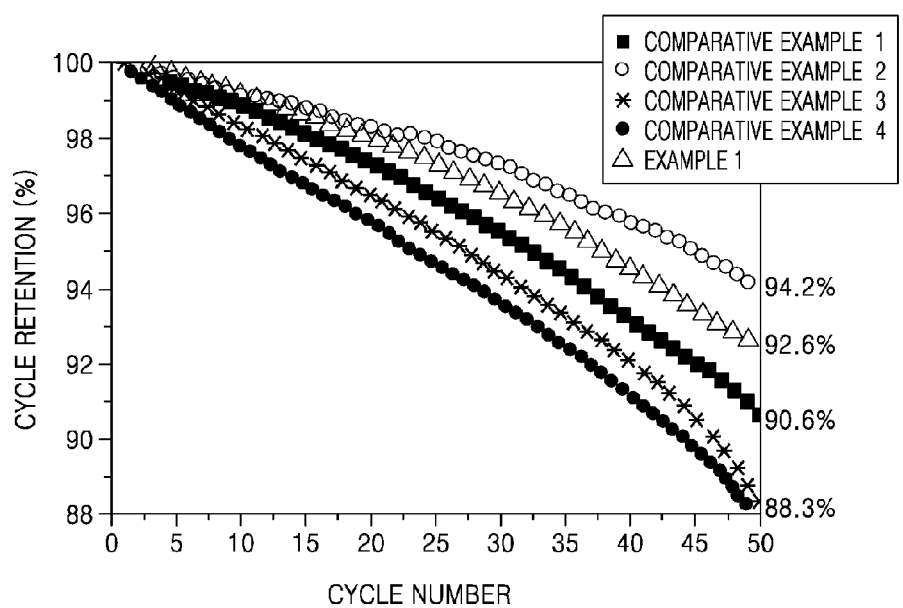
FIGS. 8A and 8B are graphs of capacity retention (percent, %) versus cycle number, showing changes in capacity retention rate and changes in discharge capacity of coin cells manufactured according to Example 8 and Comparative Examples 5 to 8.
Figure 8B:
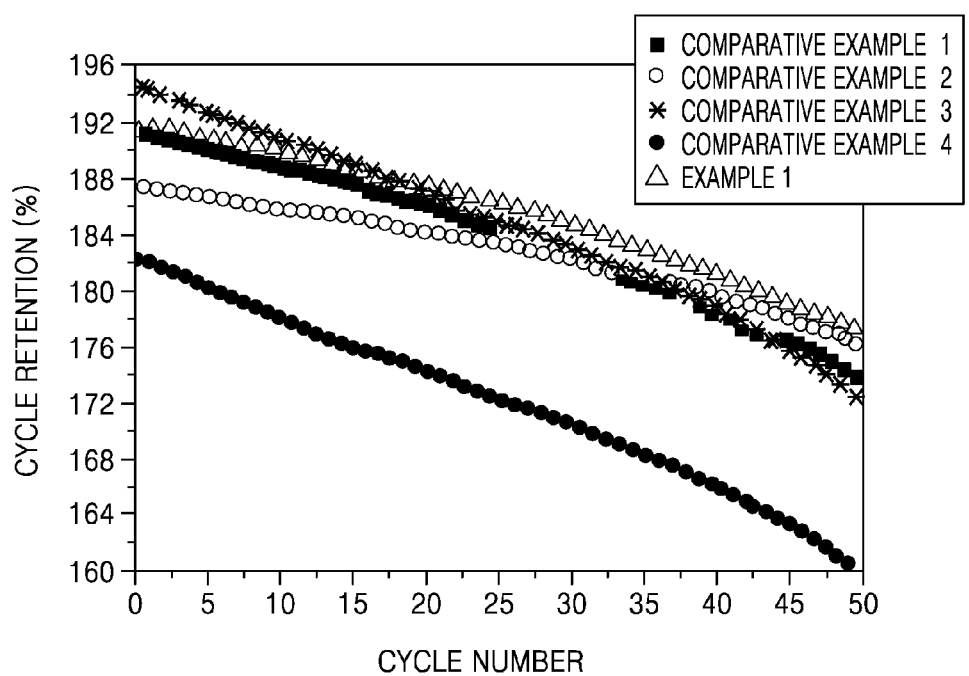

Charge and discharge characteristics at the $1^{st}$ cycle were evaluated using a charger/discharger (TOYO-3100, manufactured by TOYO) and changes in capacity retention rate and discharge capacity are shown in Table 1 below and FIGS. 8A and 8B.

TABLE 1

| | Initial capacity (mAh/g) | Capacity retention rate (%) |
|---|---|---|
| Example 8 | 191.8 | 92.6 |
| Comparative Example 5 | 191.7 | 90.6 |
| Comparative Example 6 | 187.6 | 94.2 |
| Comparative Example 7 | 193.1 | 88.3 |
| Comparative Example 8 | 182.3 | 88.2 |

As shown in Table 1 above, the coin cell of Example 8 had a higher initial capacity than each of the coin cells of Comparative Examples 6 to 8. In addition, the coin cell of Example 8 exhibited initial capacity characteristics equal to those of the coin cell of Comparative Example 5. Moreover, the coin cell of Example 8 exhibited enhanced capacity retention rate, as compared to the coin cells of Comparative Examples 5 to 8.

The coin cell of Example 8 exhibited advantages over the coin cells of Comparative Examples 7 and 8 and thus had synergistic effects, i.e., no decrease in capacity and enhanced capacity retention rate. By contrast, as shown in Table 1 above, the coin cell of Comparative Example 8 exhibited the poorest results in terms of initial capacity and capacity retention rate.

2) Examples 8 to 12

Figure 8C:
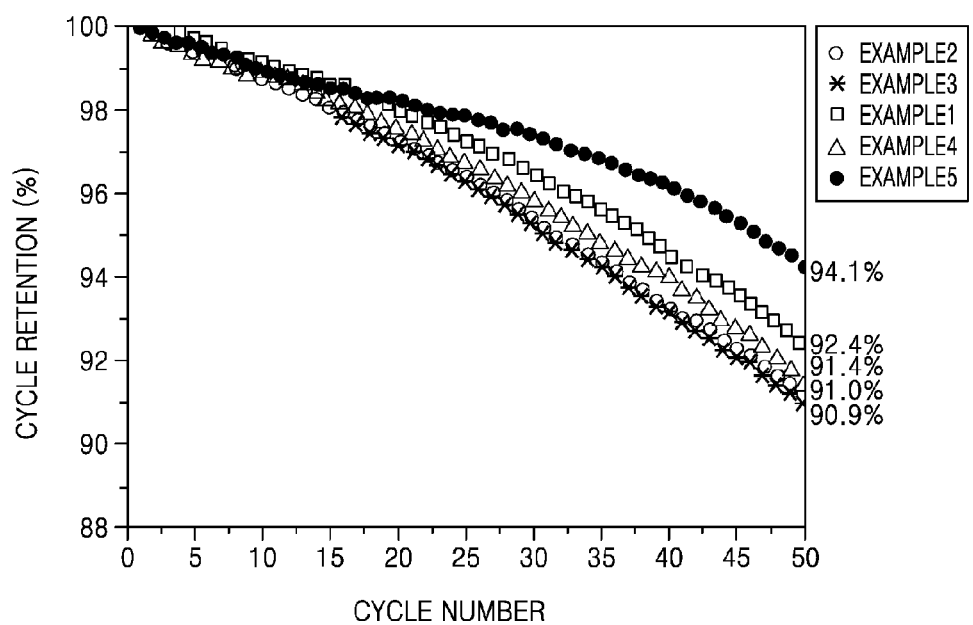
FIGS. 8C and 8D are graphs of capacity retention (%) versus cycle number, showing changes in capacity retention rate and changes in discharge capacity of coin cells manufactured according to Examples 8 to 12.
Figure 8D:
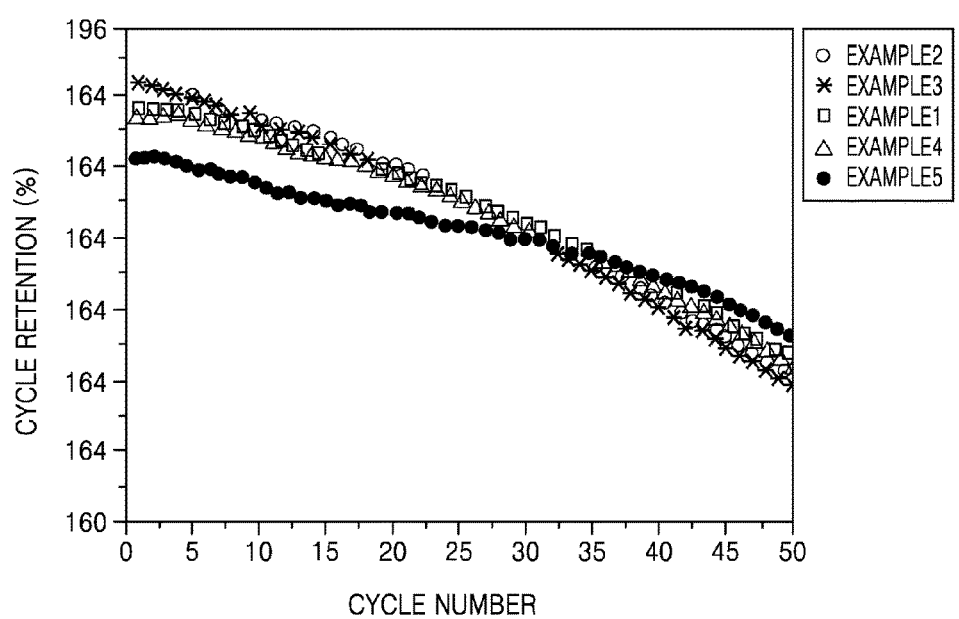

Initial capacity and capacity retention rate of each of the coin cells of Examples 8 to 12 were evaluated using the same method as used to evaluate the initial capacity and capacity retention rate of each of the coin cells of Example 8 and Comparative Examples 5 to 8. The results are shown in Table 2 below and FIGS. 8C and 8D.

TABLE 2

| | Initial capacity (mAh/g) | Capacity retention rate (%) |
|---|---|---|
| Example 8 | 191.8 | 92.6 |
| Example 9 | 192.6 | 90.9 |
| Example 10 | 192.5 | 94.2 |
| Example 11 | 191.8 | 88.3 |
| Example 12 | 188.6 | 94.1 |

As shown in Table 2, the coin cells of Examples 8 to 12 exhibited overall excellent results in terms of initial capacity and capacity retention rate. Among these coin cells, the coin cell of Example 12 exhibited a relatively small initial capacity compared to capacity retention rate, and the coin cell of Example 9 exhibited a relatively low capacity retention rate compared to initial capacity, due to $P_2O_5$ with low mobility of lithium ions. The coin cell of Example 8 exhibited the highest initial capacity and capacity retention rate.

3) Example 8 and Comparative Examples 5 and 12 to 14

Initial capacities and capacity retention rates of the coin cells of Example 8 and Comparative Examples 5 and 12 to 14 were evaluated using the same method as that described above, and the results are shown in Table 3 below.

TABLE 3

| | Initial capacity (mAh/g) | Capacity retention rate (%) |
|---|---|---|
| Example 8 | 209.3 | 92.6 |
| Comparative Example 5 | 204.6 | 90.6 |
| Comparative Example 12 | 204.26 | 92.8 |
| Comparative Example 13 | 207.18 | 89.95 |
| Comparative Example 14 | 204.3 | 90.8 |

As shown in Table 3, it is confirmed that the coin cell of Example 8 exhibited higher initial capacity and higher capacity retention rate than those of the coin cells of Comparative Examples 5 and 12 to 14.

Evaluation Example 7: Residual Lithium

1) Example 1 and Comparative Examples 1 to 4

Amounts of residual LiOH and $Li_2CO_3$ in the composite cathode active material of Example 1 and the cathode active materials of Comparative Examples 1 to 4 were measured and a total amount of residual lithium was obtained therefrom. The results are shown in Table 4 below.

TABLE 4

| | Li$_2$CO$_3$ (ppm) | LiOH (ppm) | Total amount of residual lithium (ppm) |
|---|---|---|---|
| Example 1 | 5505 | 5154 | 2525 |
| Comparative Example 1 | 9561 | 6555 | 3693 |
| Comparative Example 2 | 5755 | 5644 | 2717 |
| Comparative Example 3 | 3524 | 4455 | 1953 |
| Comparative Example 4 | — | — | 2800 |

In Table 4, the amount of residual lithium is obtained by adding the amount of LiOH and the amount of Li$_2$CO$_3$ and may be represented by Equation 3 below:

Amount of residual lithium (ppm)=(atomic weight of lithium/molecular weight of Li$_2$CO$_3$)×Li$_2$CO$_3$ (ppm))+(atomic weight of lithium/molecular weight of LiOH)×LiOH (ppm))    Equation 3

In Table 4, the total amount of residual lithium is obtained by adding the amount of lithium hydroxide and the amount of lithium carbonate. From the results shown in Table 4, it is confirmed that the cathode active material of Example 1 included a smaller amount of residual lithium than that of each of the cathode active materials of Comparative Examples 1, 2 and 4. As such, when the amount of residual lithium is small, existing problems of cathode active material slurries, e.g., instability and gas generation after being applied to batteries, due to a large amount of residual lithium may be considerably addressed.

2) Examples 1 to 5

The amount of residual lithium in each of the composite cathode active materials of Examples 1 to 5 was obtained using the same method as that used for the composite cathode active material of Example 1, and the results are shown in Table 5 below.

TABLE 5

| | Li$_2$CO$_3$ (ppm) | LiOH (ppm) | Total amount of residual lithium (ppm) |
|---|---|---|---|
| Example 1 | 5505 | 5154 | 2525 |
| Example 2 | 4647 | 4925 | 2298 |
| Example 3 | 5103 | 5012 | 2411 |
| Example 4 | 6096 | 5313 | 2683 |
| Example 5 | 5512 | 5987 | 2768 |

As shown in Table 5, it is confirmed that the composite cathode active materials of Examples 1 to 5 included a small amount of residual lithium.

3) Example 1 and Comparative Examples 1 and 7 to 9

Residual lithium in each of the composite cathode active materials of Example 1 and Comparative Examples 1 and 7 to 9 were evaluated using the method described above, and the results are shown in Table 6 below.

TABLE 6

| | Total amount of residual lithium (ppm) |
|---|---|
| Example 1 | 2525 |
| Comparative Example 1 | 3693 |

TABLE 6-continued

| | Total amount of residual lithium (ppm) |
|---|---|
| Comparative Example 7 | 2037 |
| Comparative Example 8 | 2619 |
| Comparative Example 9 | 2554 |

As shown in Table 6, the composite cathode active material of Example 1 included a smaller amount of residual lithium than each of the composite cathode active materials of Comparative Examples 1, 8 and 9.

Evaluation Example 8: Impedance Analysis

Impedance characteristics of the coin cells of Example 8 and Comparative Example 5 after the 1$^{st}$ cycle were measured according to the following method.

Figure 9A:
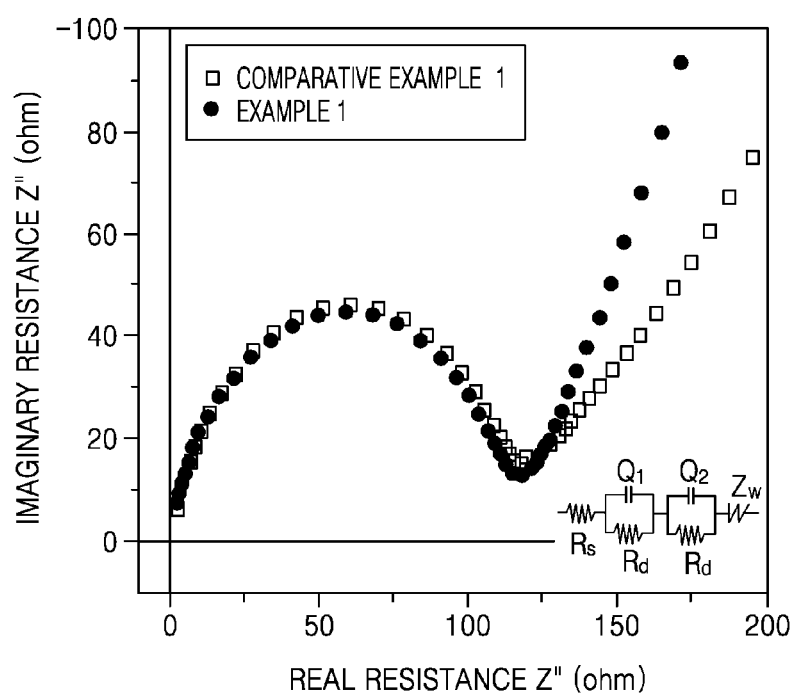
FIGS. 9A and 9B are Nyquist plots of imaginary impedance (Z", ohms) versus real impedance (Z', ohms), showing electric impedance spectroscopy (EIS) test results of the coin cells of Example 8 and Comparative Example 5 at an initial stage (after the $1^{st}$ cycle) and after the $30^{th}$ cycle, respectively.

Each coin cell was charged at a constant current (CC) of 0.1 C rate (0.38 milliampere per square centimeter (mA/cm$^2$)) at 25° C. until the voltage reached 4.4 V (vs. Li) and then, while maintaining a constant voltage (CV) of 4.4 V, the charging process was cut off at a current of 0.05 C rate. As such, the first charging process was performed, and then the impedance of each coin cell after the 1$^{st}$ cycle was evaluated by measuring the resistance thereof by using a 1260 A impedance/gain-phase analyzer (Solartron) at 25° C. according to a 2-probe method at a frequency of about 0.1 to about 10$^6$ megahertz (MHz) with a voltage bias of 10 millivolts (mV) applied. The evaluation results are shown in FIG. 9A Referring to FIG. 9A, after the 1$^{st}$ cycle, the coin cell of Example 8 had a lower real impedance Z' than that of the coin cell of Comparative Example 5.

In addition, each coin cell was charged at a constant current of 0.1 C until the voltage reached 4.5 V and then discharged at a constant current of 0.1 C until the voltage reached 2.0 V.

Each coin cell was charged at a constant current of 0.5 C and a constant voltage of 4.4 V, followed by charging up to 0.05 C, and then discharged at 1 C until the voltage reached 2.8 V. For cycle evaluation, charging at a constant current of 1 C up to 4.4 V and discharging at 1 C down to 2.8 V were performed 50 times. The entire cycle described above was performed 30 times.

Figure 9B:
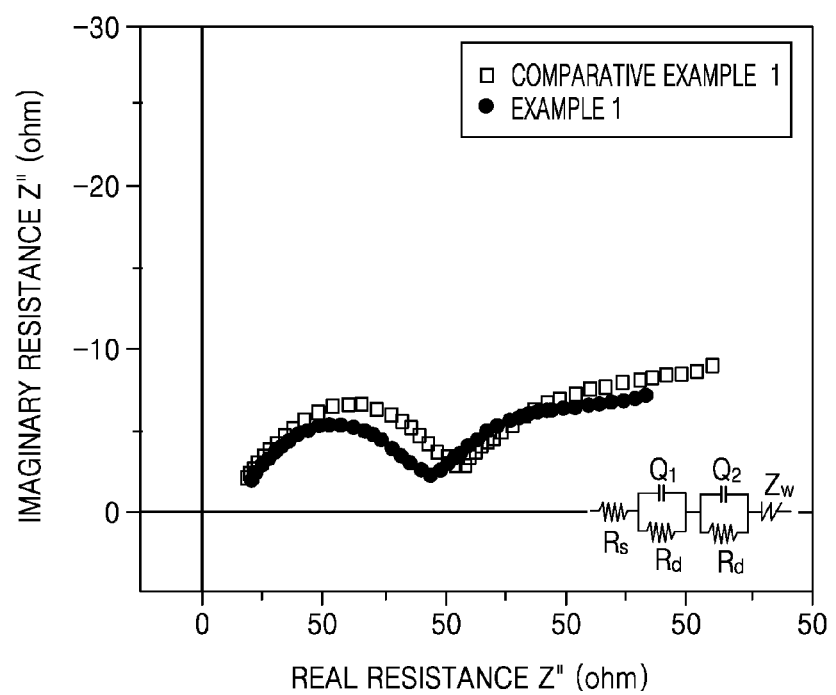

Impedances of the coin cells of Example 8 and Comparative Example 5 were measured after 30 cycles were performed after the manufacture of each coin cell and Nyquist plots for the impedance measurement results are shown in FIG. 9B.

Referring to FIG. 9B, the coin cell of Example 8 had a lower impedance than that of the coin cell of Comparative Example 5 even after 30 cycles. This result is attributed to the fact that the coin cell of Example 8 included a small amount of residual lithium and a stable solid electrolyte interface (SEI) layer was formed.

Evaluation Example 9: SEM/Energy Dispersive X-Ray Spectrometer (EDAX) Mapping Analysis SEM/EDAX mapping analysis of the composite cathode active material of Example 1 was performed to obtain a composition thereof. The SEM/EDAX mapping analysis results are shown in FIGS. 10A to 10I.

Figure 10A:
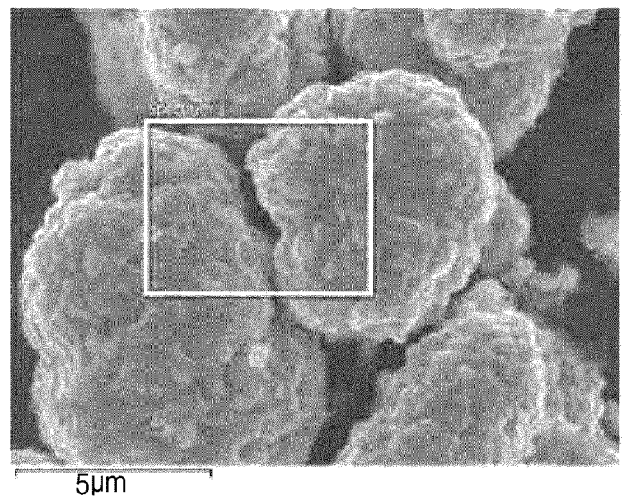
FIGS. 10A to 10H are images showing SEM/EDAX analysis results of the composite cathode active material of Example 1.
Figure 10B:
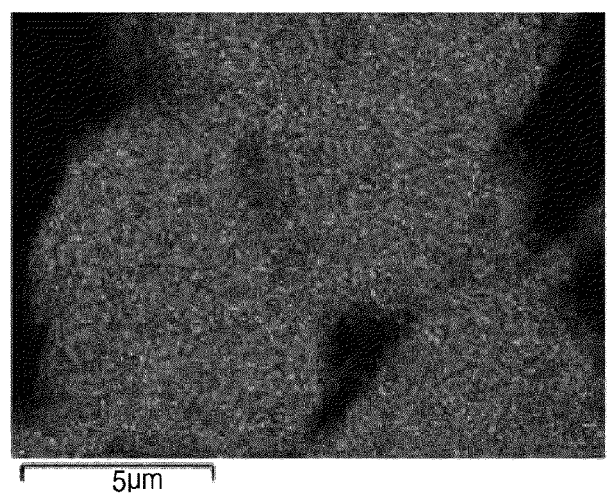
Figure 10C:
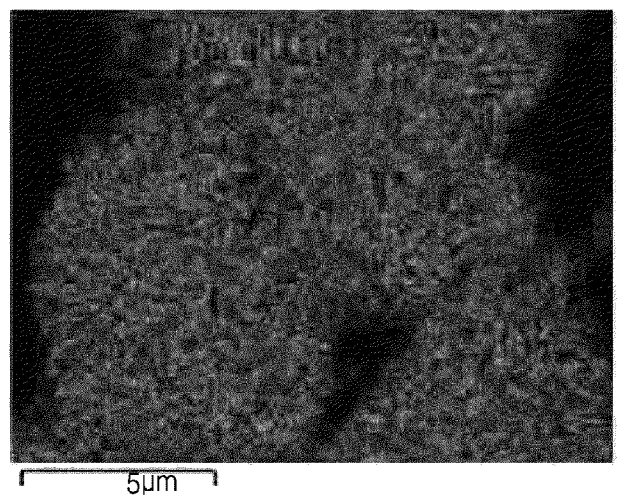
Figure 10D:
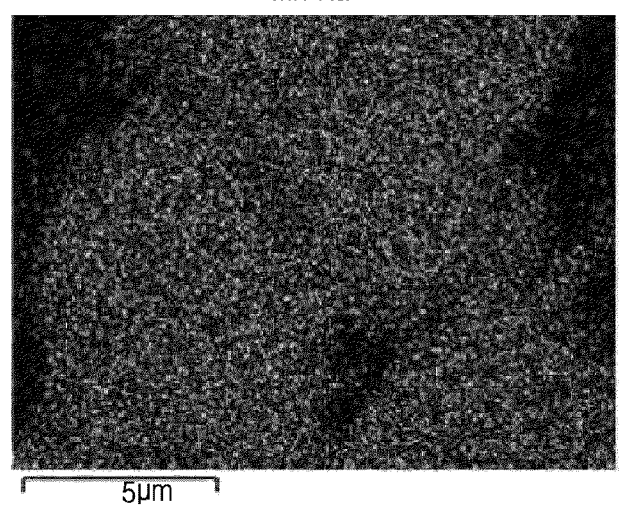
Figure 10E:
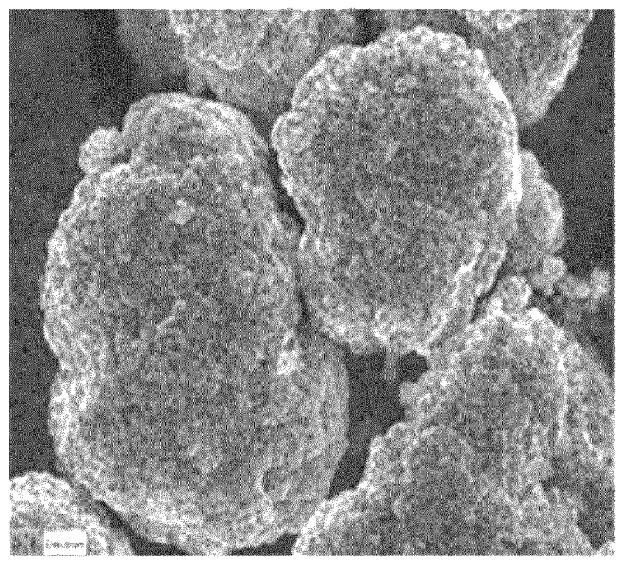
Figure 10F:
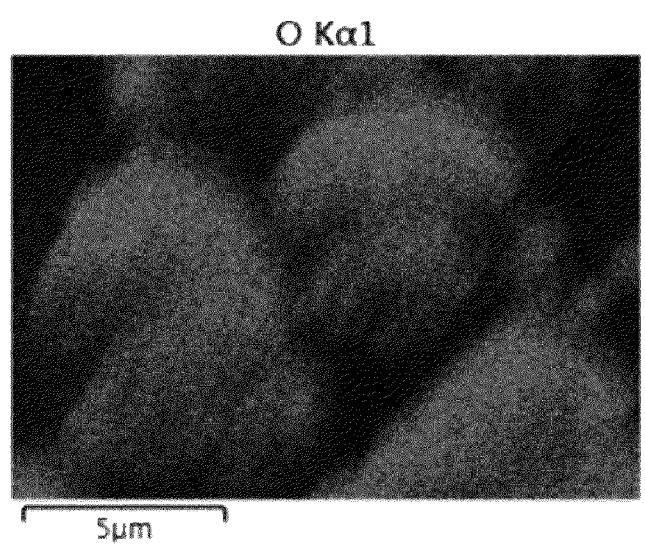
Figure 10G:
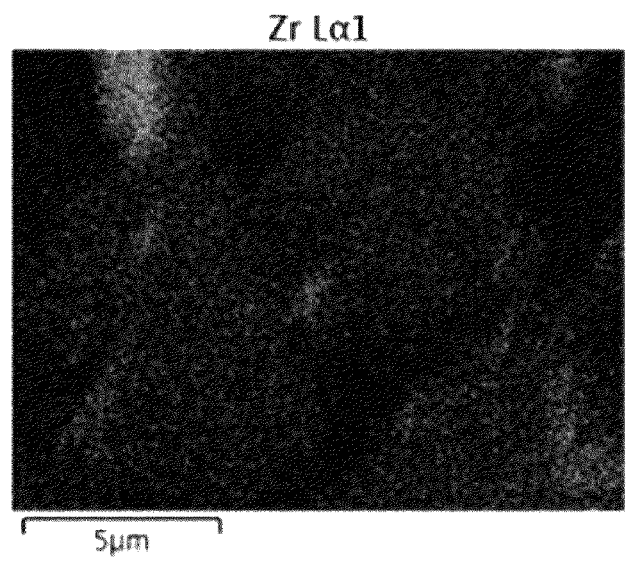
Figure 10H:
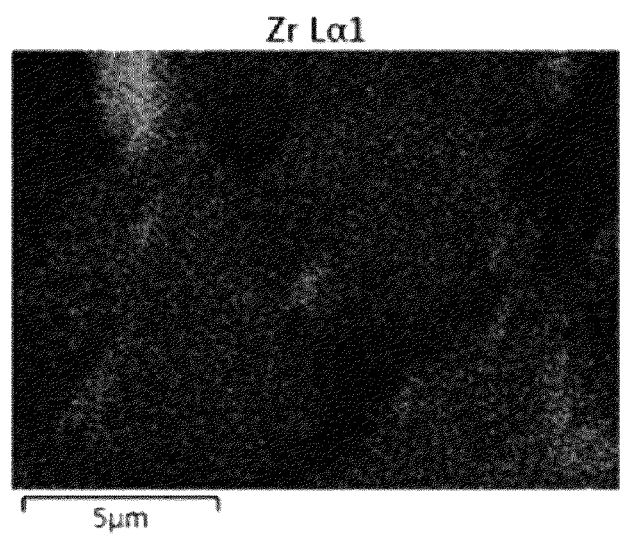
Figure 10I:
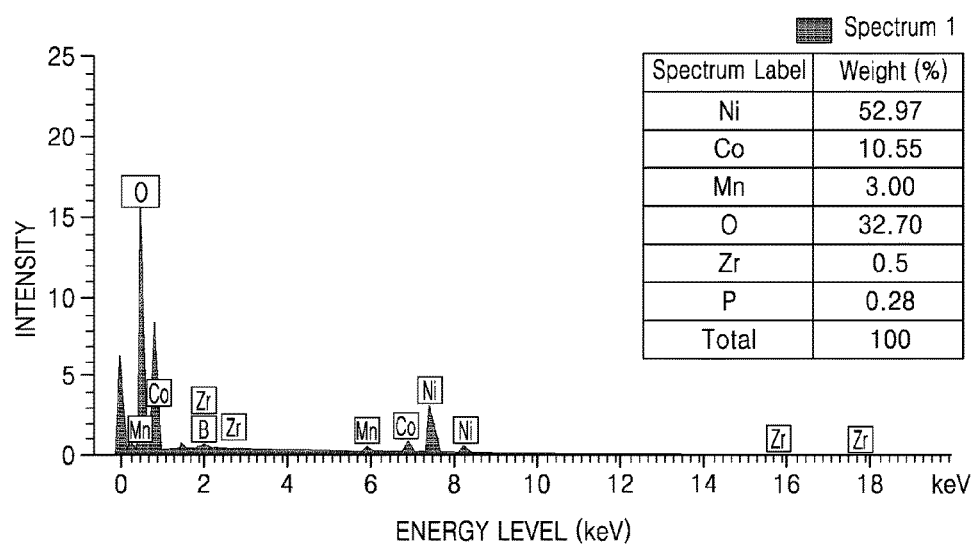
FIG. 10I is a graph of intensity (cps/eV) versus binding energy (kiloelectron volts, keV) as determined by SEM/EDAX analysis, showing the amounts of each element in the composite cathode active material of Example 1.

As illustrated in FIG. 10H, it is confirmed that P and Zr were present on a surface of the composite cathode active material without separation from each other.

Evaluation Example 10: Charge and Discharge Characteristics (dQ/dV)

With respect to the coin cells of Example 8 and Comparative Examples 5 to 7, charge and discharge characteristics and a voltage (V vs Li metal, horizontal axis) versus differential capacity (dQ/dV, vertical axis) obtained by differentiating a charging and discharging capacity by the voltage were evaluated. Each coin cell was charged at a constant current (CC) of 0.1 C up to 4.4 V and then discharged at a CC of 0.1 C down to 2.8 V.

Each coin cell was charged at a CC of 0.5 C and a CV of 4.4 V, followed by charging up to 0.05 C, and then discharged at 1 C. For cycle evaluation, charging at a CC of 1 C up to 4.4 V and discharging at 1 C down to 2.8 V 30 times were performed. The cycle described above was repeated 30 times.

The evaluation results are shown in FIGS. 11A to 11D.

Figure 11A:
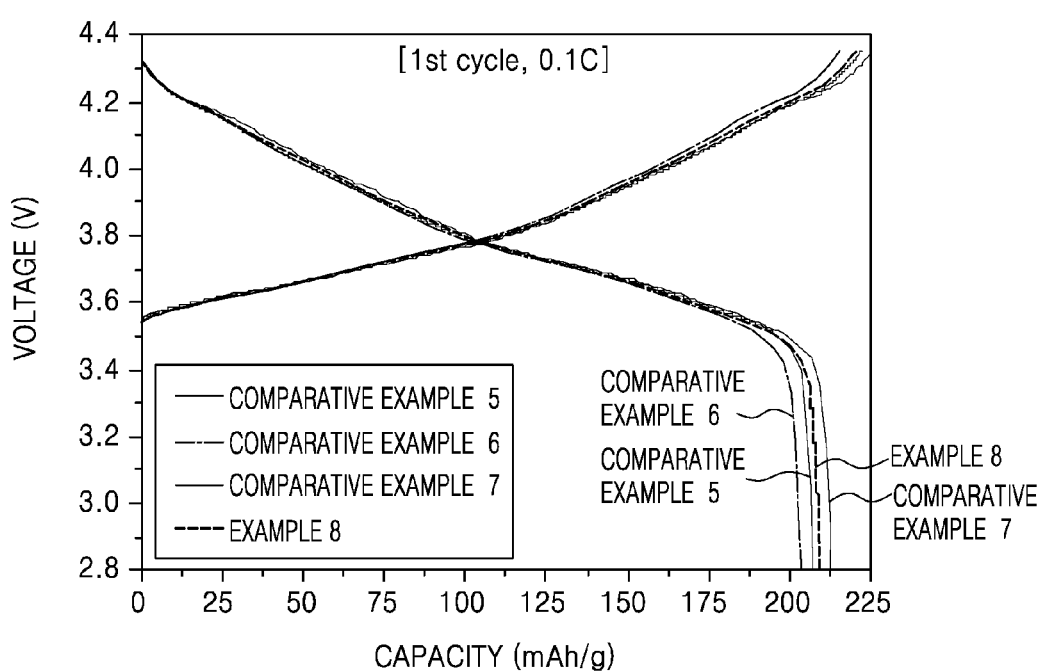
FIGS. 11A and 11B are graphs of voltage (volts, V) versus capacity (milliampere hours per gram, mAh/g), showing voltage profiles of the coin cells of Example 8 and Comparative Examples 5 to 7 after the $1^{st}$ cycle and after the $30^{th}$ cycle, respectively.
Figure 11B:
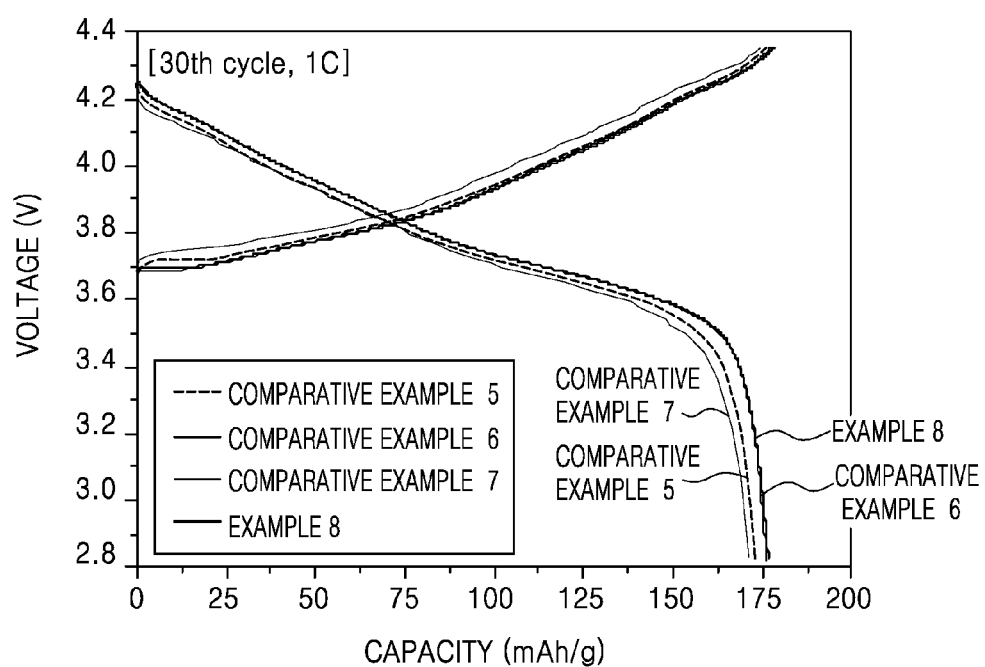
Figure 11C:
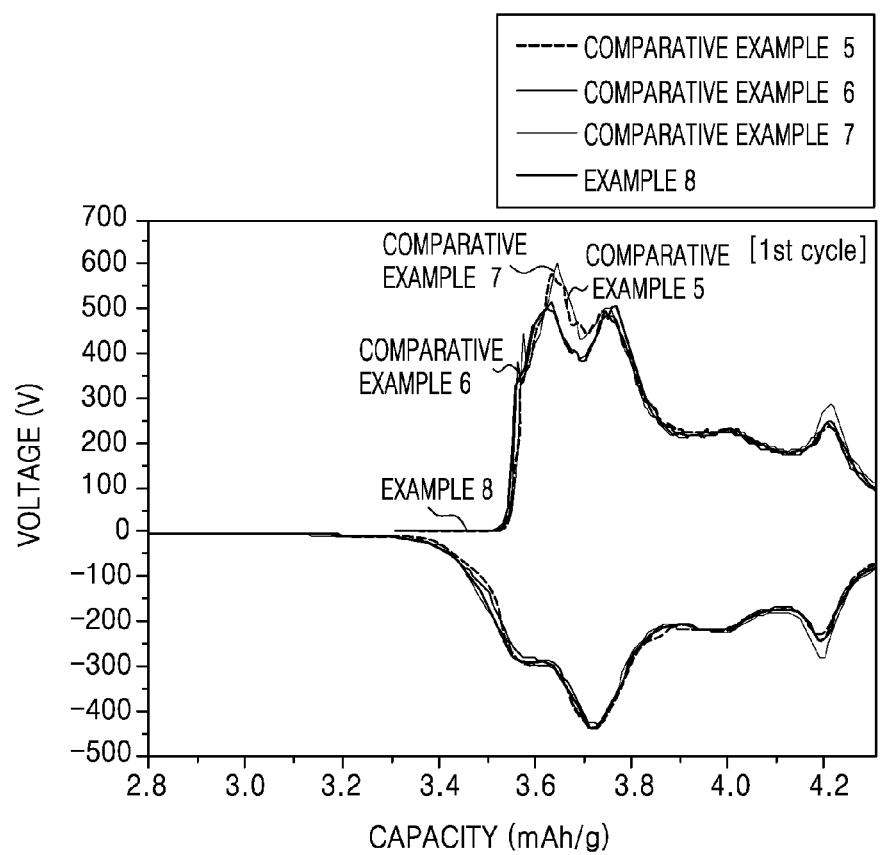
FIGS. 11C and 11D are graphs of voltage (volts, V) versus capacity (mAh/g), showing differential capacity (dQ/dV) characteristics of the coin cells of Example 8 and Comparative Examples 5 to 7 after the $1^{st}$ cycle and after the $30^{th}$ cycle, respectively.
Figure 11D:
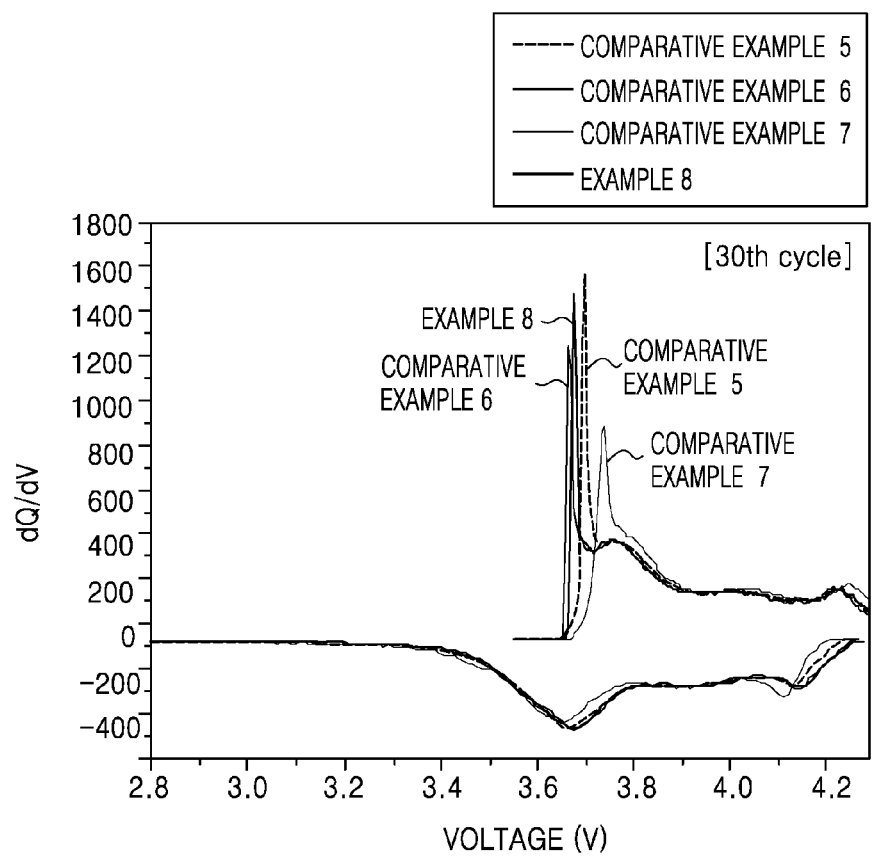

FIGS. 11A and 11B are graphs showing voltage profiles of the coin cells of Example 8 and Comparative Examples 5 to 7 after the 1$^{st}$ cycle and after the 30$^{th}$ cycle, respectively. FIGS. 11C and 11D are graphs showing dQ/dV characteristics of the coin cells of Example 8 and Comparative Examples 5 to 7 after the 1$^{st}$ cycle and after the 30$^{th}$ cycle, respectively.

As illustrated in FIG. 11C, each coin cell had a similar voltage after the 1$^{st}$ cycle. However, as illustrated in FIG. 11D, the coin cell of Comparative Example 7 exhibited high resistance characteristics after the 30$^{th}$ cycle. The coin cell of Comparative Example 6 had a low redox voltage due to a stable SEI layer.

Evaluation Example 12: Charge and Discharge Characteristics (High-Rate Characteristics)

1) Examples 8 to 12 and Comparative Example 5

Each of the coin cells of Examples 8 to 12 and Comparative Example 5 was charged at a CC of 0.1 C up to 4.5 V and then discharged at a CC of 0.1 C down to 2.0 V.

Each coin cell was subjected to CC/CV charging at 0.5 C up to 4.5 V, followed by charging up to 0.05 C, and then discharged at 0.1 C/0.2 C/0.3 C/1 C/2 C/3 C down to 2.0 V. For cycle evaluation, charging at a CC of 1 C up to 4.5 V and discharging at 1 C down to 2.0 V was performed 50 times. The entire cycle described above was repeated 50 times.

Figure 12A:
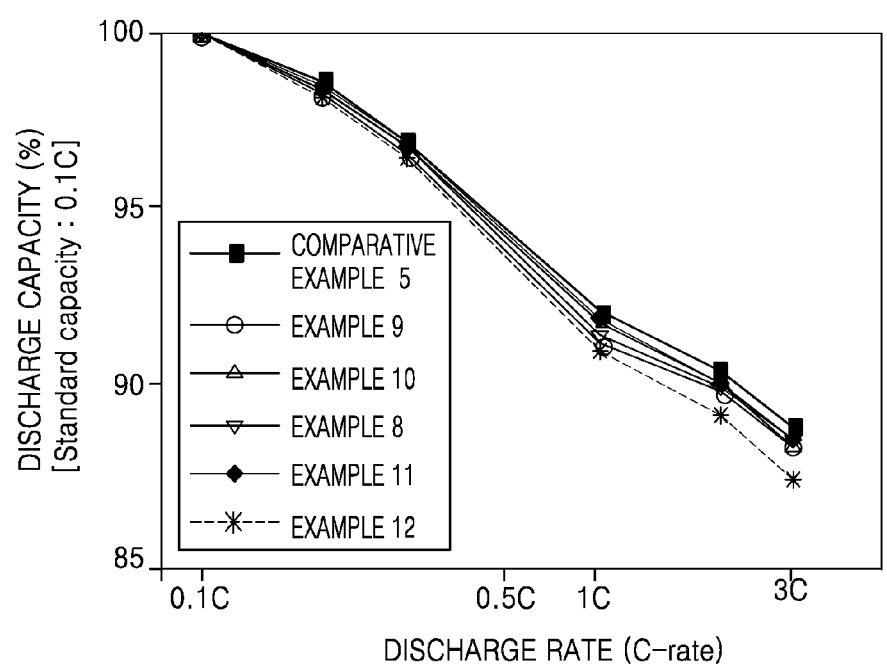
FIGS. 12A and 12B are graphs of discharge capacity (%) versus discharge rate (C-rate), showing high-rate characteristics of coin cells manufactured according to Examples 8 to 12 and Comparative Example 5.
Figure 12B:
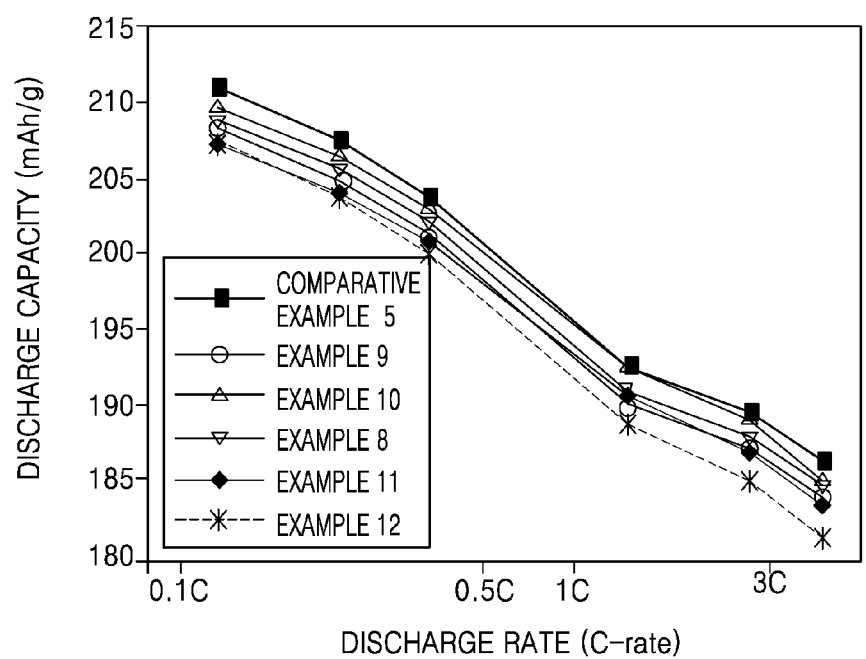

The evaluation results are shown in FIGS. 12A and 12B. In FIGS. 12A and 12B, uncoated cathode active material represents Comparative Example 5, and ZrP55, ZrP28, ZrP46, ZrP64, and ZrP82 respectively represent Examples 8 to 12.

Referring to the drawings, when molar ratios of Zr to P are 2:8, 4:6, 5:5, 6:4, and 8:2, capacity retention rates are 91.0%, 90.9%, 92.4%, 91.4%, and 94.1%, respectively. The initial capacity at 1 C tends to increase as the amount of P increases, which is attributed to an increase in ionic diffusion of Li$_3$PO$_4$ and a decrease in residual lithium. By contrast, the capacity retention rate increases as the amount of Zr increases, which is because a reaction between an electrolyte and a cathode is further suppressed.

As is apparent from the foregoing description, a composite cathode active material according to an embodiment includes no residual lithium, is prevented from degrading under repeated charging/discharging conditions, and has excellent capacity properties. By using the composite cathode active material, a lithium battery with high discharge capacity and enhanced initial characteristics and capacity retention rate may be manufactured.

It should be understood that embodiments described herein should be considered in a descriptive sense only and not for purposes of limitation. Descriptions of features or aspects within each embodiment should be considered as available for other similar features or aspects in other embodiments.

While an embodiment has been described with reference to the figures, it will be understood by those of ordinary skill in the art that various changes in form and details may be made therein without departing from the spirit and scope as defined by the following claims.

What is claimed is:

1. A composite cathode active material for a lithium battery, the composite cathode active material comprising:
   a lithium composite oxide; and
   a coating layer disposed on at least a portion of the lithium composite oxide and comprising a composite comprising ZrP$_2$O$_7$ and LiZr$_2$(PO$_4$)$_3$,
   wherein the composite comprising ZrP$_2$O$_7$ and LiZr$_2$(PO$_4$)$_3$ is a reaction product of an acid-treated zirconium precursor, a phosphorus precursor, and the lithium composite oxide.

2. The composite cathode active material of claim 1, wherein the composite comprising ZrP$_2$O$_7$ and LiZr$_2$(PO$_4$)$_3$ is a product of drying and heat-treating a mixture of the acid-treated zirconium precursor, the phosphorus precursor, and the lithium composite oxide.

3. The composite cathode active material of claim 1, wherein the composite comprising ZrP$_2$O$_7$ and LiZr$_2$(PO$_4$)$_3$ is a reaction product of heat treatment at about 700° C. or greater.

4. The composite cathode active material of claim 1, wherein the coating layer further comprises at least one Li$_2$ZrP$_2$O$_8$, Zr$_2$P$_2$O$_9$, ZrO$_2$, or Li$_2$ZrO$_3$.

5. The composite cathode active material of claim 1, wherein an amount of ZrP$_2$O$_7$ in the composite comprising ZrP$_2$O$_7$ and LiZr$_2$(PO$_4$)$_3$ is from about 0.2 mole to about 2 moles, based on 1 mole of LiZr$_2$(PO$_4$)$_3$.

6. The composite cathode active material of claim 1, wherein an amount of P in the composite is from about 0.1 mole to about 10 moles, based on 1 mole of Zr.

7. The composite cathode active material of claim 1, wherein an amount of the composite comprising ZrP$_2$O$_7$ and LiZr$_2$(PO$_4$)$_3$ is from about 0.1 weight percent to about 10 weight percent, based on a total weight of the composite cathode active material.

8. The composite cathode active material of claim 1, wherein, in the coating layer, the LiZr$_2$(PO$_4$)$_3$ is adjacent to the lithium composite oxide.

9. The composite cathode active material of claim 1, wherein the coating layer is a continuous film.

10. The composite cathode active material of claim 1, wherein the lithium composite oxide comprises at least one of a layered oxide, an olivine-containing oxide, or a spinel-phase oxide.

11. The composite cathode active material of claim 1, wherein the lithium composite oxide comprises at least one of Formulae 1 to 6 below:

wherein, in Formula 1, 1.0≤a≤1.4, 0<x<1, 0≤y<1, 0<z<1, 0≤c<1, 0<x+y+z+c≤1, and 0≤e<1;

M is at least one V, Mg, Ga, Si, W, Mo, Fe, Cr, Cu, Zn, Ti, Al, or B; and

A is at least one anion element selected from F, S, Cl, or Br, $$Li[Co_{1-x}M_x]O_{2-b}A_b \quad \text{Formula 2}$$

wherein, in Formula 2, $0 \leq b \leq 0.1$ and $0 \leq x \leq 0.1$;

M is at least one of Mg, Al, Ni, Mn, Zn, Fe, Cr, Ga, Mo, or W; and

A is at least one of F, S, Cl, or Br, $$Li_{1+a}[Ni_{1-x}M_x]O_{2-b}A_b \quad \text{Formula 3}$$

wherein, in Formula 3, $0 \leq a \leq 0.2$, $0 \leq b \leq 0.1$, and $0.01 \leq x \leq 0.5$;

M is at least one of Mg, Al, Co, Mn, Zn, Fe, Cr, Ga, Mo, or W; and

A is at least one of F, S, Cl, or Br, $$Li_{1+a}[Mn_{2-x}M_x]O_{4-b}A_b \quad \text{Formula 4}$$

wherein, in Formula 4, $0 \leq a \leq 0.15$, $0 \leq b \leq 0.1$, and $0 \leq x \leq 0.1$;

A is at least one of F, S, Cl, or Br, and

M is at least one of Co, Ni, Cr, Mg, Al, Zn, Mo, or W, $$LiM_xFe_{1-x}PO_4 \quad \text{Formula 5}$$

wherein, in Formula 5, M is at least one of Co, Ni, or Mn; and $0 \leq x \leq 1$, $$Li_{1+a}[Ni_{0.5}Mn_{1.5-x}M_x]O_{4-b}A_b \quad \text{Formula 6}$$

wherein, in Formula 6, $0 \leq a \leq 0.15$, $0 \leq b \leq 0.1$, and $0 \leq x \leq 0.1$;

A is at least one of F, S, Cl, or Br; and

M is at least one of Co, Ni, Cr, Mg, Al, Zn, Mo, or W.

12. The composite cathode active material of claim 1, wherein the lithium composite oxide comprises a compound represented by Formula 7 below:

$$Li_aNi_xCo_yMn_zM_cO_{2-b}A_b \quad \text{Formula 7}$$

wherein, in Formula 7, $1.0 \leq a \leq 1.4$, $0<x<1$, $0 \leq y<1$, $0<z<1$, $0 \leq c<1$, $0<x+y+z+c \leq 1$, and $0 \leq b \leq 0.1$;

M is at least one of V, Mg, Ga, Si, W, Mo, Fe, Cr, Cu, Zn, Ti, Al, or B; and

A is at least one of F, S, Cl, or Br.

13. The composite cathode active material of claim 1, wherein the lithium composite oxide is a layered compound represented by Formula 8 below:

$$Li_aNi_xCo_yMn_zO_{2-b}A_b \quad \text{Formula 8}$$

wherein, in Formula 8, $1.0 \leq a \leq 1.4$, $0.7 \leq x \leq 1$, $0 \leq y<1$, $0<z<1$, $0<x+y+z \leq 1$, and $0 \leq b \leq 0.1$;

M is at least one of V, Mg, Ga, Si, W, Mo, Fe, Cr, Cu, Zn, Ti, Al, or B; and

A is at least one of F, S, Cl, or Br.

14. The composite cathode active material of claim 1, wherein the lithium composite oxide comprises at least one of $Li_{1.015}Ni_{0.8}Co_{0.15}Mn_{0.05}O_2$, $Li_{1.015}Ni_{0.8}Co_{0.1}Mn_{0.1}O_2$, $Li_{1.015}Ni_{0.7}Co_{0.2}Mn_{0.1}O_2$, $Li_{1.015}Ni_{0.7}Co_{0.25}Mn_{0.05}O_2$, $Li_{1.015}Ni_{0.9}Co_{0.05}Mn_{0.05}O_2$, $Li_{1.015}Ni_{0.91}Co_{0.06}Mn_{0.03}O_2$, $Li_{1.015}Ni_{0.88}Co_{0.06}Mn_{0.06}O_2$, $LiNi_{0.8}Co_{0.15}Mn_{0.05}O_2$; $Li_{1.08}Ni_{0.8}Co_{0.15}Mn_{0.05}O_2$, $Li_{1.08}Ni_{0.8}Co_{0.1}Mn_{0.1}O_2$, $Li_{1.08}Ni_{0.7}Co_{0.2}Mn_{0.1}O_2$, $Li_{1.08}Ni_{0.7}Co_{0.25}Mn_{0.05}O_2$, $Li_{1.08}Ni_{0.9}Co_{0.05}Mn_{0.05}O_2$, $Li_{1.08}Ni_{0.91}Co_{0.06}Mn_{0.03}O_2$, $Li_{1.08}Ni_{0.88}Co_{0.06}Mn_{0.06}O_2$; $LiNi_{0.8}Co_{0.1}Mn_{0.1}O_2$, $LiNi_{0.7}Co_{0.2}Mn_{0.1}O_2$, $LiNi_{0.7}Co_{0.25}Mn_{0.05}O_2$, $LiNi_{0.9}Co_{0.05}Mn_{0.05}O_2$, $LiNi_{0.91}Co_{0.06}Mn_{0.03}O_2$, $LiNi_{0.88}Co_{0.06}Mn_{0.06}O_2$; $Li_{1.1}Ni_{0.8}Co_{0.15}Mn_{0.05}O_2$, $Li_{1.1}Ni_{0.8}Co_{0.1}Mn_{0.1}O_2$, $Li_{1.1}Ni_{0.7}Co_{0.2}Mn_{0.1}O_2$, $Li_{1.1}Ni_{0.7}Co_{0.25}Mn_{0.05}O_2$, $Li_{1.15}Ni_{0.9}Co_{0.05}Mn_{0.05}O_2$, $Li_{1.1}Ni_{0.91}Co_{0.06}Mn_{0.03}O_2$, $Li_{1.1}Ni_{0.88}Co_{0.06}Mn_{0.06}O_2$; $Li_{1.15}Ni_{0.8}Co_{0.15}Mn_{0.05}O_2$, $Li_{1.15}Ni_{0.8}Co_{0.1}Mn_{0.1}O_2$, $Li_{1.15}Ni_{0.7}Co_{0.2}Mn_{0.1}O_2$, $Li_{1.15}Ni_{0.7}Co_{0.25}Mn_{0.05}O_2$, $Li_{1.15}Ni_{0.9}Co_{0.05}Mn_{0.05}O_2$, $Li_{1.15}Ni_{0.91}Co_{0.06}Mn_{0.03}O_2$, $Li_{1.15}Ni_{0.88}Co_{0.06}Mn_{0.06}O_2$; $Li_{1.2}Ni_{0.8}Co_{0.15}Mn_{0.05}O_2$, $Li_{1.2}Ni_{0.8}Co_{0.1}Mn_{0.1}O_2$, $Li_{1.2}Ni_{0.7}Co_{0.2}Mn_{0.1}O_2$, $Li_{1.2}Ni_{0.7}Co_{0.25}Mn_{0.05}O_2$, $Li_{1.2}Ni_{0.9}Co_{0.05}Mn_{0.05}O_2$, $Li_{1.2}Ni_{0.91}Co_{0.06}Mn_{0.03}O_2$, $Li_{1.2}Ni_{0.88}Co_{0.06}Mn_{0.06}O_2$; $Li_{1.3}Ni_{0.8}Co_{0.15}Mn_{0.05}O_2$, $Li_{1.3}Ni_{0.8}Co_{0.1}Mn_{0.1}O_2$, $Li_{1.3}Ni_{0.7}Co_{0.2}Mn_{0.1}O_2$, $Li_{1.3}Ni_{0.7}Co_{0.25}Mn_{0.05}O_2$, $Li_{1.3}Ni_{0.9}Co_{0.05}Mn_{0.05}O_2$, $Li_{1.3}Ni_{0.91}Co_{0.06}Mn_{0.03}O_2$, $Li_{1.3}Ni_{0.88}Co_{0.06}Mn_{0.06}O_2$; $Li_{1.4}Ni_{0.8}Co_{0.15}Mn_{0.05}O_2$, $Li_{1.4}Ni_{0.8}Co_{0.1}Mn_{0.1}O_2$, $Li_{1.4}Ni_{0.7}Co_{0.2}Mn_{0.1}O_2$, $Li_{1.4}Ni_{0.7}Co_{0.25}Mn_{0.05}O_2$, $Li_{1.4}Ni_{0.9}Co_{0.05}Mn_{0.05}O_2$, $Li_{1.4}Ni_{0.91}Co_{0.06}Mn_{0.03}O_2$, $Li_{1.4}Ni_{0.88}Co_{0.06}Mn_{0.06}O_2$; $Li_{1.5}Ni_{0.8}Co_{0.15}Mn_{0.05}O_2$, $Li_{1.5}Ni_{0.8}Co_{0.1}Mn_{0.1}O_2$, $Li_{1.5}Ni_{0.7}Co_{0.2}Mn_{0.1}O_2$, $Li_{1.5}Ni_{0.7}Co_{0.25}Mn_{0.05}O_2$, $Li_{1.5}Ni_{0.9}Co_{0.05}Mn_{0.05}O_2$, $Li_{1.5}Ni_{0.91}Co_{0.06}Mn_{0.03}O_2$, or $Li_{1.5}Ni_{0.88}Co_{0.06}Mn_{0.06}O_2$.

15. The composite cathode active material of claim 1, wherein an amount of free lithium in the composite cathode active material is about 3,000 parts per million or less, and wherein the composite cathode active material has a discharge capacity of about 200 milliampere hours per gram or more.

16. The composite cathode active material of claim 1, wherein the coating layer has a thickness of about 1 nanometer to about 1 micrometer.

17. A method of preparing a composite cathode active material, the method comprising:

providing an acidic zirconium precursor mixture comprising a zirconium precursor, a solvent, and an acid;

providing a phosphorus precursor mixture comprising a phosphorus precursor and a solvent;

mixing a lithium composite oxide with the acidic zirconium precursor mixture and the phosphorus precursor mixture;

drying the mixture of the lithium composite oxide, the acidic zirconium precursor mixture, and the phosphorus precursor mixture to form a dried product; and heat-treating the dried product to prepare the composite cathode active material, wherein the composite cathode active material comprises:

a lithium composite oxide; and a coating layer disposed on at least a portion of the lithium composite oxide and comprising a composite comprising $ZrP_2O_7$ and $LiZr_2(PO_4)_3$.

18. The method of claim 17, wherein the heat-treating is performed at about 700° C. or greater in an oxidative gas atmosphere.

19. The method of claim 17, wherein the mixing is performed at a temperature of about 25° C. to about 90° C.

20. The method of claim 17, wherein the drying is performed at a temperature of about 30° C. to about 150° C.

21. The method of claim 17, wherein the acidic zirconium precursor mixture has a pH of about 5 or less.

22. The method of claim 17, wherein the acid comprises at least one of nitric acid, hydrochloric acid, or sulfuric acid.

23. The method of claim 17, wherein a weight ratio of the solvent to the acid is from about 1:0.01 to about 1:1, and wherein an amount of the solvent is two times or less than a weight of the lithium composite oxide.

24. The method of claim 17, wherein the zirconium precursor comprises at least one of zirconium oxynitrate, zirconium chloride, zirconium acetate, zirconium hydroxide, or zirconium nitride.

25. The method of claim 17, wherein the phosphorus precursor comprises at least one of ammonium phosphate, triammonium phosphate trihydrate, ammonium dihydrogen phosphate, or phosphoric acid.

26. The method of claim 17, wherein the lithium composite oxide is a layered compound represented by Formula 8 below:

$$Li_aNi_xCo_yMn_zO_{2-b}A_b \qquad \text{Formula 8}$$

wherein, in Formula 8, $1.0 \leq a \leq 1.4$, $0.7 \leq x < 1$, $0 \leq y < 1$, $0 < z < 1$, $0 < x+y+z \leq 1$, and $0 \leq b \leq 0.1$;

M is at least one of V, Mg, Ga, Si, W, Mo, Fe, Cr, Cu, Zn, Ti, Al, or B; and

A is at least one of F, S, Cl, or Br.

27. The method of claim 17, wherein the lithium composite oxide is prepared by providing a precursor mixture and heat-treating the precursor mixture at a temperature of about 400° C. to about 900° C. in an inert gas atmosphere or in an oxidative gas atmosphere.

28. A cathode for a lithium battery, the cathode comprising the composite cathode active material of claim 1.

29. A lithium battery including the cathode according to claim 28.

* * * * *